(12) United States Patent
Okada et al.

(10) Patent No.: US 11,329,576 B2
(45) Date of Patent: May 10, 2022

(54) POWER GENERATING ELEMENT

(71) Applicant: TRI-FORCE MANAGEMENT CORPORATION, Saitama (JP)

(72) Inventors: Kazuhiro Okada, Saitama (JP); Miho Okada, Saitama (JP)

(73) Assignee: TRI-FORCE MANAGEMENT CORPORATION, Saitama (JP)

( * ) Notice: Subject to any disclaimer, the term of this patent is extended or adjusted under 35 U.S.C. 154(b) by 896 days.

(21) Appl. No.: 15/918,691

(22) Filed: Mar. 12, 2018

(65) Prior Publication Data

US 2019/0068087 A1 Feb. 28, 2019

(30) Foreign Application Priority Data

Aug. 29, 2017 (JP) .............................. JP2017-164789

(51) Int. Cl.
*H02N 2/18* (2006.01)

(52) U.S. Cl.
CPC .................. *H02N 2/188* (2013.01)

(58) Field of Classification Search
CPC .......... H02N 2/186; H02N 2/18; H01H 13/06; H01H 13/14; H01H 13/20; H01H 2233/07;

(Continued)

(56) References Cited

U.S. PATENT DOCUMENTS 6,046,531 A 4/2000 Kikuchi et al.
7,486,004 B2 * 2/2009 Allan .................. H01L 41/0953
310/328

(Continued)

FOREIGN PATENT DOCUMENTS

CN 203608112 U 5/2014
CN 204361937 U 5/2015

(Continued)

OTHER PUBLICATIONS

Engineering Toolbox Website with lists of Modulus of Elasticity of Brass and Nickel (Year: 2021).*

(Continued)

*Primary Examiner* — Bryan P Gordon
(74) *Attorney, Agent, or Firm* — Holtz, Holtz & Volek PC

(57) ABSTRACT

A power generating element is provided that includes first and second plate-like structures, a pedestal that supports the first plate-like structure, and first and second piezoelectric elements that generate charges on the basis of the deflections of the two plate-like structures. A base end portion of the first plate-like structure is connected to the pedestal, and a direction from the base end portion toward the tip end portion of the first plate-like structure is a Y-axis positive direction. A base end portion of the second plate-like structure is connected to the tip end portion of the first plate-like structure via a connection body, and a direction from the base end portion toward the tip end portion of the second plate-like structure is a Y-axis negative direction. A frequency band of a half-value width of a resonance system formed on the basis of the flexibility of the second plate-like structure at least partially overlaps a frequency band of a half-value width of a resonance system formed on the basis of the flexibility of the first plate-like structure.

23 Claims, 15 Drawing Sheets

(58) Field of Classification Search
CPC ......... H01H 2235/01; H01H 2239/076; H03K 17/964; H03K 17/965; H01L 41/1136
USPC .................................... 310/318, 319, 339
See application file for complete search history.

(56) References Cited

U.S. PATENT DOCUMENTS

| | | | |
|---|---|---|---|
| 8,513,861 B2* | 8/2013 | Horiguchi | H01L 41/1136 310/339 |
| 9,246,414 B2 | 1/2016 | Sakaguchi et al. | |
| 9,590,533 B2* | 3/2017 | Inman | H02N 2/186 |
| 9,871,472 B2 | 1/2018 | Jia et al. | |
| 2006/0055287 A1* | 3/2006 | Kawakubo | H01L 41/0946 310/348 |
| 2006/0217776 A1* | 9/2006 | White | H01L 41/1136 607/35 |
| 2008/0136292 A1* | 6/2008 | Thiesen | H02N 2/186 310/334 |
| 2013/0249350 A1* | 9/2013 | Fujimoto | H01L 41/33 310/332 |
| 2013/0293069 A1* | 11/2013 | Sakaguchi | H01L 41/053 310/348 |
| 2013/0320807 A1* | 12/2013 | Sakaguchi | H02N 2/188 310/339 |
| 2014/0077662 A1* | 3/2014 | Lueke | H01L 41/22 310/339 |
| 2015/0135869 A1* | 5/2015 | Jia | H01L 41/1136 74/96 |
| 2015/0145376 A1 | 5/2015 | Sun et al. | |
| 2016/0218272 A1* | 7/2016 | Capobianco | H01L 41/083 |
| 2016/0254437 A1* | 9/2016 | Yao | H01L 41/053 310/328 |
| 2017/0077839 A1* | 3/2017 | Karami | A61N 1/3756 |

FOREIGN PATENT DOCUMENTS

| | | | | |
|---|---|---|---|---|
| CN | 104904110 A | | 9/2015 | |
| CN | 105337531 A | | 2/2016 | |
| CN | 106374777 A | | 2/2017 | |
| CN | 106787943 A | | 5/2017 | |
| CN | 108476003 A | | 8/2018 | |
| JP | 01179270 U | | 12/1989 | |
| JP | 11072333 A | | 3/1999 | |
| JP | 11101816 A | | 4/1999 | |
| JP | 2013158117 A | | 8/2013 | |
| JP | 2019029733 A | * | 2/2019 | ........... H01L 41/047 |
| KR | IKR-20090079161 A | * | 7/2009 | ........... B81B 3/0021 |
| WO | 2012105368 A1 | | 8/2012 | |
| WO | 2012137695 A1 | | 10/2012 | |
| WO | 2014170922 A1 | | 10/2014 | |

OTHER PUBLICATIONS

Japanese Office Action dated Mar. 13, 2018 (and English language translation thereof) issued in counterpart Japanese Application No. 2017-164789.
Chinese Office Action dated Aug. 1, 2019 (and English translation thereof) issued in Chinese Application No. 201810218288.8.

* cited by examiner

| VIBRATION DIRECTION | FIRST PIEZOELECTRIC ELEMENT 98 | | | | SECOND PIEZOELECTRIC ELEMENT 100 | | | |
|---|---|---|---|---|---|---|---|---|
| | Ea1 | Ea2 | Ea3 | Ea4 | Eb1 | Eb2 | Eb3 | Eb4 |
| X-AXIS DIRECTION | − | + | + | − | − | + | + | − |
| Y-AXIS DIRECTION | − | + | − | + | − | + | − | + |
| Z-AXIS DIRECTION | − | − | − | − | + | + | + | + |

| VIBRATION DIRECTION | FIRST PIEZOELECTRIC ELEMENT 104 | | SECOND PIEZOELECTRIC ELEMENT 106 | |
|---|---|---|---|---|
| | Ea1 | Ea2 | Eb1 | Eb2 |
| Y-AXIS DIRECTION | − | + | − | + |
| Z-AXIS DIRECTION | − | − | + | + |

POWER GENERATING ELEMENT

BACKGROUND OF THE INVENTION

Field of the Invention

The present invention relates to a power generating element that generates power by converting mechanical vibration energy into electric energy.

Background Art

A power generating element 18 is described in the related art. As illustrated in FIG. 14A, this power generating element 18 includes a flexible plate-like structure 10, a piezoelectric element 12, a pedestal 14, and a weight 16 disposed on a tip portion of the plate-like structure 10. The piezoelectric element 12 generates a charge on the basis of a deflection of the plate-like structure 10. The pedestal 14 supports a base end portion of the plate-like structure 10 as a cantilevered structure. The power generating element 18 is used by attaching the pedestal 14 to a vibration source 20. In a Cartesian coordinate system, that is, an XYZ three-dimensional coordinate system, the plate-like structure 10 is disposed such that the plate surface thereof becomes a surface parallel to the XY plane.

As illustrated in FIG. 14B, the piezoelectric element 12 includes a lower electrode layer G covering an entirety of the top surface of the plate-like structure 10, a piezoelectric material layer P covering an entirety of the top surface of the lower electrode layer G, and an upper electrode layer E disposed in a specific region of the top surface of the piezoelectric material layer P. Thus, the region where the upper electrode layer E is provided substantially operates as the piezoelectric element 12.

When vibration in a Z-axis direction is applied to the pedestal 14, as illustrated in FIG. 15A, the vibration acts on the weight 16 and the plate-like structure 10, the plate-like structure 10 deflects in a thickness direction, and a charge is generated in the piezoelectric element 12 on the basis of this deflection. Then, the charge generated in the piezoelectric element 12 is drawn out as power via a rectifying-smoothing circuit (not illustrated in the drawings) connected to the piezoelectric element 12.

The power generating element 18 has one resonance system (resonance frequency frz) based on the flexibility of the plate-like structure 10. As illustrated in FIG. 15B, which depicts the relationship between frequency fz and amplitude A, when the frequency fz of the applied vibration is close to the resonance frequency frz, the plate-like structure 10 resonates with that vibration and the amplitude A of the plate-like structure 10 increases. Accordingly, the power generation capacity of the power generating element 18 can be increased by setting the resonance frequency frz close to the frequency fz of the applied vibration and increasing the Q factor of the resonance, thereby raising the peak value of the amplitude A (raising the Q factor of the resonance).

The resonance frequency frz can be set by adjusting a spring constant of the Z-axis direction of the plate-like structure 10 and the weight of the weight 16. For example, the resonance frequency frz can be raised by increasing the spring constant or reducing the weight of the weight 16. The Q factor of the resonance can be increased by minimizing the components that dampen vibration (e.g. by creating a vacuum state).

Patent Document 1 (US2013/0293069A1, WO2012105368A1) describes a piezoelectric power generating device having one resonance system, similar to the power generating element 18 described above.

With the conventional power generating element 18 described above and the piezoelectric power generating device described in Patent Document 1, it is possible to increase power generation capacity by increasing the Q factor of the resonance system, but there are physical limitations thereto. Consequently, power generation efficiency has been low even in cases where the resonance frequency frz has been precisely matched to the frequency fz of the applied vibration.

Therefore, an object of the invention is to provide a power generating element with a simple structure and whereby power generation capacity can be dramatically increased over conventional levels.

SUMMARY OF THE INVENTION

An aspect of the invention is a power generating element including first and second plate-like structures having flexibility, a pedestal supporting the first plate-like structure, and a piezoelectric element that generates a charge on the basis of a deflection of the first and second plate-like structures or on the basis of a deflection of the second plate-like structure. In such a power generating element, the first and second plate-like structures are disposed in an XYZ three-dimensional coordinate system such that plate surfaces of the first and second plate-like structures are surfaces parallel to an XY plane. Additionally, a base end portion of the first plate-like structure is directly or indirectly connected to the pedestal, and the first plate-like structure extends in a direction parallel to a Y-axis such that a direction from the base end portion toward a tip end portion of the first plate-like structure is a Y-axis positive direction. A base end portion of the second plate-like structure is connected to the tip end portion of the first plate-like structure via a connection body, and the second plate-like structure extends in a direction parallel to the Y-axis such that a direction from the base end portion toward a tip end portion of the second plate-like structure is a Y-axis negative direction. Moreover, a frequency band of a half-value width of a resonance system formed on the basis of the flexibility of the second plate-like structure at least partially overlaps a frequency band of a half-value width of a resonance system formed on the basis of the flexibility of the first plate-like structure.

The first and second plate-like structures are disposed overlapping in a direction in which the first and second plate-like structures deflect, with a predetermined spacing therebetween. Alternatively, the first and second plate-like structures may be disposed on planes parallel to the XY plane, with a predetermined spacing therebetween. A length in the Y-axis direction of the second plate-like structure is shorter than a length in the Y-axis direction of the first plate-like structure.

Another aspect of the invention is a power generating element including n number of plate-like structures having flexibility, where n is a nonnegative integer of 3 or greater, a pedestal supporting one of the n number of plate-like structures, namely a first plate-like structure, and a piezoelectric element that generates a charge on the basis of a deflection of the n number of plate-like structures or on the basis of a deflection of an $n^{th}$ plate-like structure. In such a power generating element, the n number of plate-like structures are disposed in an XYZ three-dimensional coordinate system such that plate surfaces of the n number of plate-like structures are surfaces parallel to an XY plane. Additionally, a base end portion of the first plate-like structure is directly or indirectly connected to the pedestal, and the first plate-like structure extends in a direction parallel to a Y-axis such that a direction from the base end portion toward a tip end portion of the first plate-like structure is a Y-axis positive direction. A base end portion of a $ka^{th}$ plate-like structure, where ka is an even number and $2 \leq ka \leq n$, is connected to a tip end portion of a $ka-1^{th}$ plate-like structure via a connection body, and the $ka^{th}$ plate-like structure of the n number of plate-like structures extends in a direction parallel to the Y-axis such that a direction from the base end portion toward the tip end portion of the $ka^{th}$ plate-like structure is a Y-axis negative direction. A base end portion of a $kb^{th}$ plate-like structure, where kb is an odd number and $3 \leq kb \leq n$, is connected to a tip end portion of a $kb-1^{th}$ plate-like structure via a connection body, and the $kb^{th}$ plate-like structure of the n number of plate-like structures extends in a direction parallel to the Y-axis such that a direction from the base end portion toward a tip portion of the $kb^{th}$ plate-like structure is a Y-axis positive direction. Moreover, a frequency band of a half-value width of a resonance system formed on the basis of the flexibility of the $n^{th}$ plate-like structure at least partially overlaps a frequency band of a half-value width of a resonance system formed on the basis of the flexibility of another of the plate-like structures.

The n number of plate-like structures are disposed overlapping in a direction in which the plate-like structures deflect, with a predetermined spacing therebetween. Alternatively, the n number of plate-like structures may be disposed on planes parallel to the XY plane, with a predetermined spacing therebetween, but preferably are disposed on the same plane as the XY plane. Furthermore, a length in the Y-axis direction of the $n^{th}$ plate-like structure is shorter than a length in the Y-axis direction of an $n-1^{th}$ plate-like structure.

A further aspect of the invention is a power generating element including n number of plate-like structures having flexibility, where n is a nonnegative integer of 3 or greater, a pedestal supporting one of the n number of plate-like structures, namely a first plate-like structure, and a piezoelectric element that generates a charge on the basis of a deflection of the n number of plate-like structures or on the basis of a deflection of the second to $n^{th}$ plate-like structures. In such a power generating element, the n number of plate-like structures are disposed in an XYZ three-dimensional coordinate system such that plate surfaces of the n number of plate-like structures are surfaces parallel to an XY plane. Additionally, a base end portion of the first plate-like structure is directly or indirectly connected to the pedestal, and the first plate-like structure extends in a direction parallel to a Y-axis such that a direction from the base end portion toward a tip end portion of the first plate-like structure is a Y-axis positive direction. The base end portions of the plate-like structures other than the first plate-like structure are connected to the tip end portion of the first plate-like structure via a connection body, and the plate-like structures other than the first plate-like structure extend in a direction parallel to the Y-axis such that a direction from the base end portions toward tip end portions of the plate-like structures other than the first plate-like structure is a Y-axis negative direction. Moreover, a frequency band of a half-value width of a resonance system formed on the basis of the flexibility of the first plate-like structure at least partially overlaps a frequency band of a half-value width of a resonance system formed on the basis of the flexibility of another of the plate-like structures.

The n number of plate-like structures may be disposed overlapping in a direction in which the plate-like structures deflect, with a predetermined spacing therebetween, or may be disposed on planes parallel to the XY plane, with a predetermined spacing therebetween, but preferably are disposed on the same plane as the XY plane. Furthermore, a length in the Y-axis direction of the $n^{th}$ plate-like structure is shorter than a length in the Y-axis direction of an $n-1^{th}$ plate-like structure.

In each of the power generating elements described above, a weight body may be provided on the tip end portion of the plate-like structure of at least a portion of the plurality of plate-like structures.

Advantageous Effects of the Invention

The power generating element according to the invention includes at least two mutually connected resonance systems, and is configured so that the frequency bands of the half-value widths of the resonance characteristics overlap each other. As such, the Q of the overall resonance can be greatly increased due to the interaction between the resonance systems. Accordingly, it is possible to dramatically increase power generation capacity over that of conventional levels for vibration in frequency bands in which half-value widths overlap each other. Moreover, a simple structure is achieved, which enables simple manufacturing using common manufacturing processes.

DESCRIPTION OF THE PREFERRED EMBODIMENTS

Figure 1A:
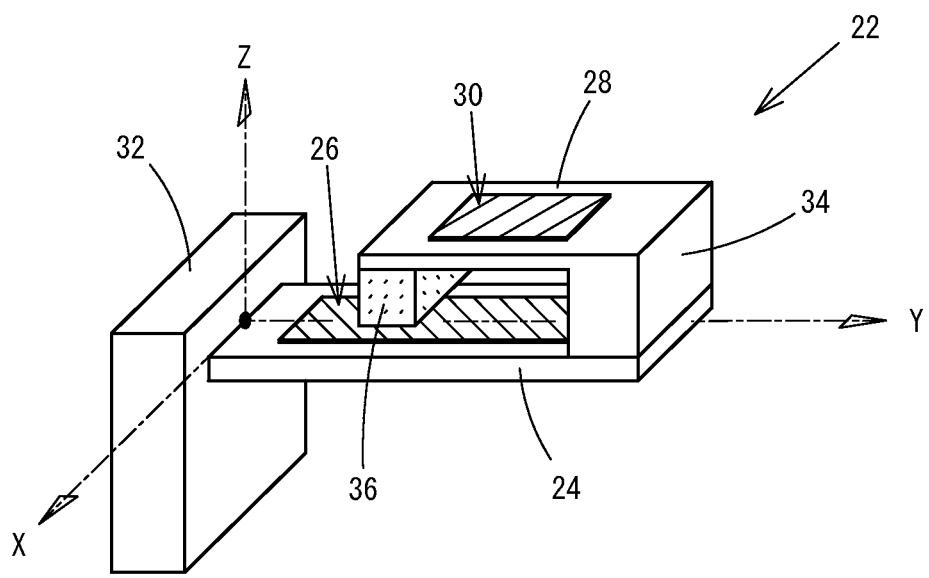
FIG. 1A is a perspective view of an appearance of a power generating element according to a first embodiment of the invention.

Next, a first embodiment of the power generating element of the invention will be described while referencing FIGS. 1A to 2B. As illustrated in FIG. 1A, a power generating element 22 according to this embodiment includes a first plate-like structure 24 having flexibility, a first piezoelectric element 26 that generates a charge on the basis of a deflection of the first plate-like structure 24, a second plate-like structure 28 having flexibility, a second piezoelectric element 30 that generates a charge on the basis of a deflection of the second plate-like structure 28, and a pedestal 32 that supports the first plate-like structure 24 as a cantilevered structure. The power generating element 22 is used by attaching the pedestal 14 to a vibration source 20. In an XYZ three-dimensional coordinate system, the plate surfaces of the plate-like structures 24 and 28 are disposed so as to be surfaces parallel to the XY plane.

A base end portion of the first plate-like structure 24 is directly connected to the pedestal 32, and the first plate-like structure 24 extends in a direction parallel to the Y-axis such that a direction from the base end portion toward a tip end portion of the first plate-like structure 24 is a Y-axis positive direction. The second plate-like structure 28 is positioned above the first plate-like structure 24 in the Z-axis direction, a base end portion of the second plate-like structure 28 is connected to the tip end portion of the first plate-like structure 24 via a connection body 34, and the second plate-like structure 28 extends in a direction parallel to the Y-axis such that a direction from the base end portion toward a tip end portion of the second plate-like structure 28 is a Y-axis negative direction. Specifically, the first and second plate-like structures 24 and 28 are disposed overlapping in the direction in which the first and second plate-like structures 24 and 28 deflect, namely the Z-axis direction, with a predetermined spacing provided therebetween by the connection body 34. A length in the Y-axis direction of the second plate-like structure 28 is shorter than a length in the Y-axis direction of the first plate-like structure 24. A weight body 36 is provided on the tip end portion of the second plate-like structure 28. Thus, the resonance frequencies of the first plate-like structure 24 and the second plate-like structure 28 are set to a predetermined resonance frequency (described later).

Figure 14A:
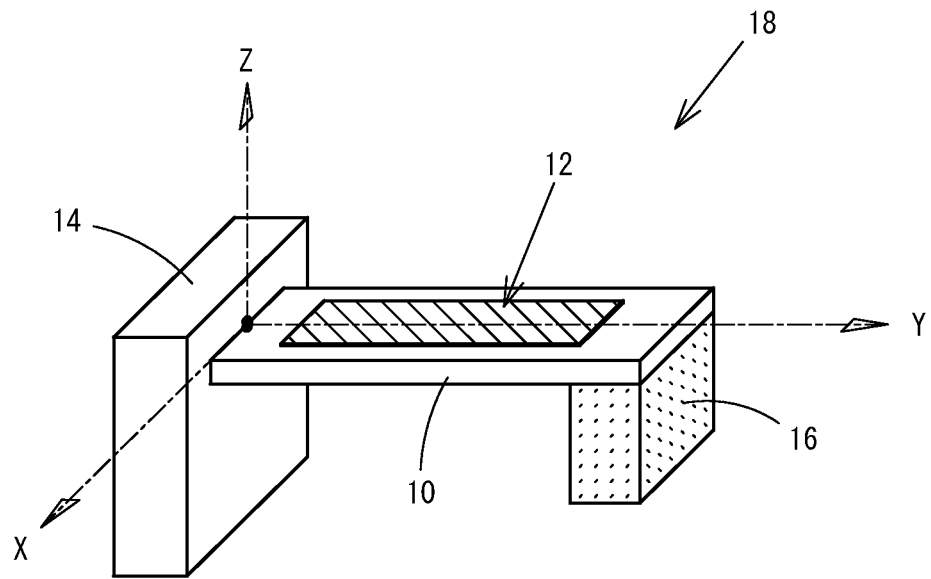
FIG. 14A is a perspective view of an appearance of a conventional power generating element.
Figure 14B:
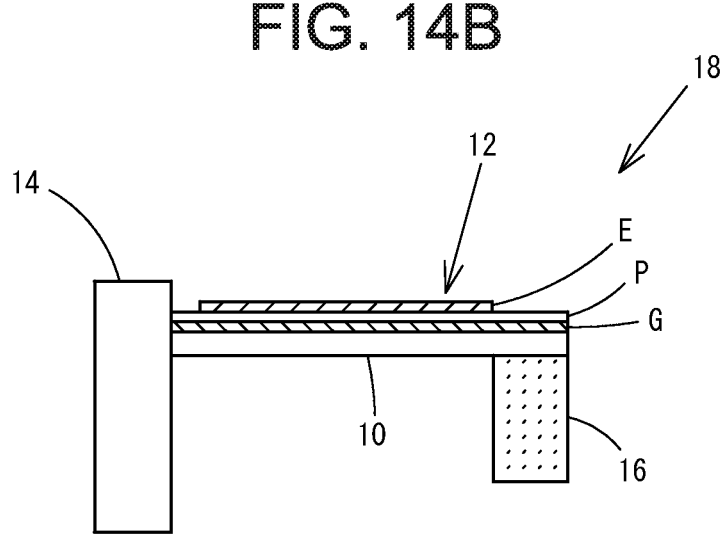
FIG. 14B is a front view of a structure of a conventional piezoelectric element.
Figure 15A:
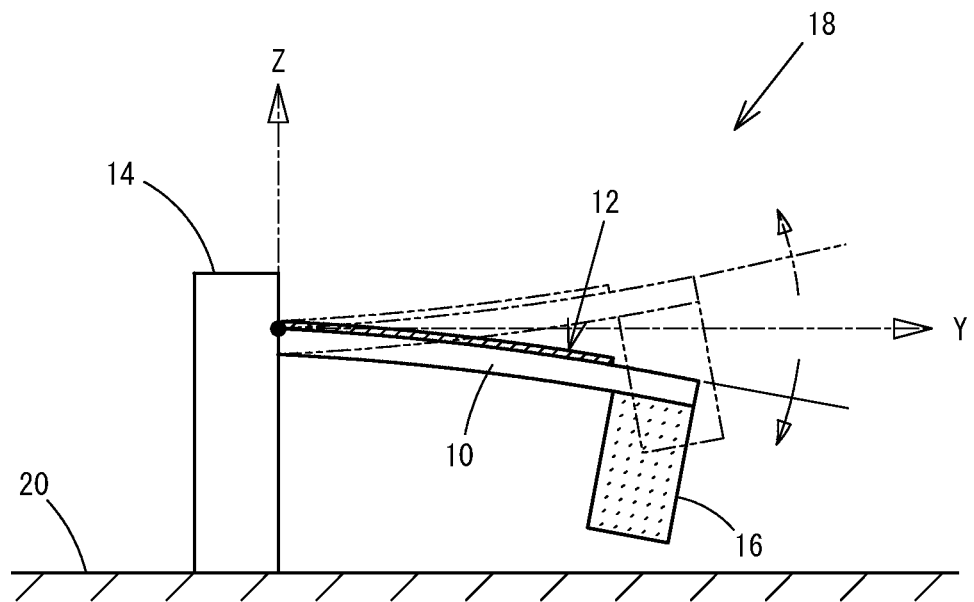
FIG. 15A is a front view illustrating operations of the power generating element illustrated in FIGS. 14A and 14B when vibration is applied in the Z-axis direction.
Figure 15B:
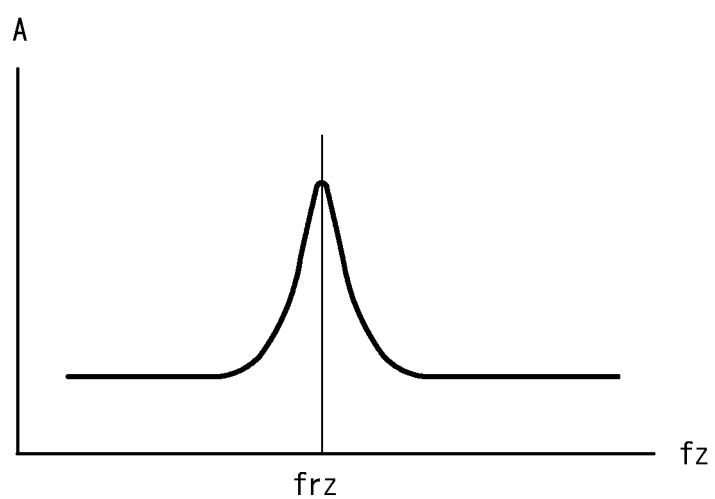
FIG. 15B is a graph illustrating the resonance characteristics of the Z-axis direction and the power generation capacity of this conventional power generating element.

As with the piezoelectric element 12 illustrated in FIG. 14B, the first and second piezoelectric elements 26 and 30 respectively include a lower electrode layer G, a piezoelectric material layer P, and an upper electrode layer E.

Two resonance systems Re1 and Re2 are formed in the power generating element 22 by the structure described above. The first resonance system Re1 is formed on the basis of the flexibility of the first plate-like structure 24, and a resonance frequency frz1 of the Z-axis direction is set by adjusting a spring constant of the Z-axis direction of the first plate-like structure 24 and the masses of the members (the masses of the connection body 34, the second plate-like structure 28, and the weight body 36) connected to the tip end portion of the first plate-like structure 24.

The second resonance system Re2 is formed on the basis of the flexibility of the second plate-like structure 28, and a resonance frequency frz2 of the Z-axis direction is set by adjusting a spring constant of the Z-axis direction of the second plate-like structure 28 and the mass of the member (the mass of the weight body 36) connected to the tip end portion of the second plate-like structure 28.

Figure 2A:
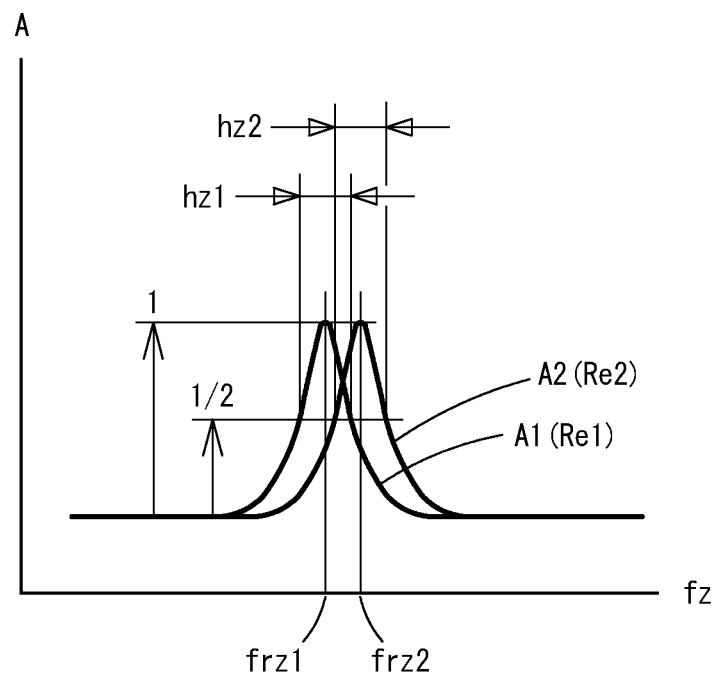
FIG. 2A is a graph illustrating resonance characteristics of the Z-axis direction of first and second resonance systems of the power generating element according to the first embodiment.

The resonance characteristics of the two resonance systems Re1 and Re2 are expressed in FIG. 2A, which depicts the relationship between frequency fz and amplitude A. The resonance characteristics of the second resonance system Re2 illustrated in FIG. 2A assume a state in which the base end portion of the second plate-like structure 28 is directly connected to the pedestal 32, and do not include interaction with the first resonance system Re1.

In the resonance characteristics of the first resonance system Re1, resonance with the applied vibration occurs near the resonance frequency frz1, which results in the occurrence of a peak where the amplitude A1 increases. The amplitude A1 is ½ or greater the peak value at the frequency band of the half-value width hz1, which is centered on the resonance frequency frz1. In the resonance characteristics of the second resonance system Re2, resonance with the applied vibration occurs near the resonance frequency frz2, which results in the occurrence of a peak where the amplitude A2 increases. The amplitude A2 is ½ or greater the peak value at the frequency band of the half-value width hz2, which is centered on the resonance frequency frz2. A portion of the frequency band of the half-value width hz1 of the first resonance system Re1 and a portion of the frequency band of the half-value width hz2 of the second resonance system Re2 overlap each other.

Next, operations of the power generating element 22 when vibration in the Z-axis direction is applied to the power generating element 22 will be described. To simplify this description, it is assumed that Q factors of the first and second resonance systems Re1 and Re2 are respectively Qz1 (>>1) and Qz2(>>1), Qz1 and QZ2 are equivalent to each other, and the resonance frequencies frz1 and frz2 match each other. A case is considered in which vibrations of the same frequencies as the resonance frequencies frz1 and frz2 are applied to the power generating element 22.

Figure 1B:
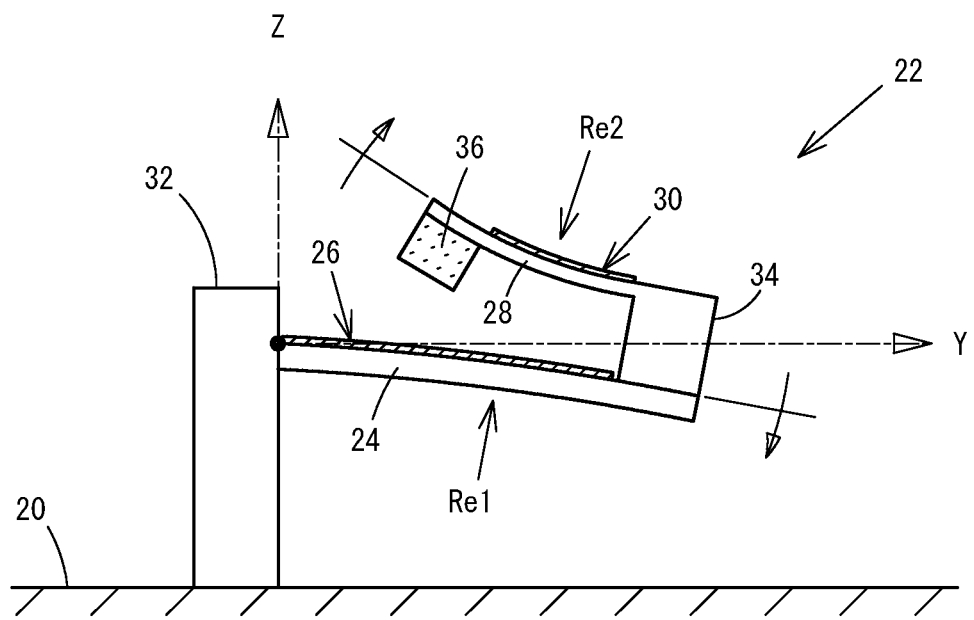
FIG. 1B is a front view illustrating operations of the power generating element according to a first embodiment when vibration is applied in a Z-axis direction.

When vibration is applied to the pedestal 32, this vibration is transmitted to the first resonance system Re1 and, as illustrated in FIG. 1B, the first plate-like structure 24 deflects in the thickness direction and acceleration (Qz1*α) is generated at the tip end portion of the first plate-like structure 24 at Qz1-times the acceleration α at which the pedestal 32 is displaced. Accordingly, a charge is generated that is approximately equivalent to the difference (Qz1*α) between the accelerations of the tip end portion and the base end portion in the first piezoelectric element 26.

When the vibration of the tip end portion of the first plate-like structure 24 transmits to the second resonance system Re2, the second plate-like structure 28 deflects in the opposite direction of the first plate-like structure 24. Acceleration (Qz2*Qz1*α) is generated at the tip end portion of the second plate-like structure 28 at Qz2-times the acceleration at which the tip end portion of the first plate-like structure 24 is displaced. Accordingly, a charge is generated that is approximately equivalent to the difference (Qz2*Qz1*α) between the accelerations of the tip end portion and the base end portion in the second piezoelectric element 30.

Thus, the power generating element 22 can obtain a charge equivalent to (Qz1*α) by the first resonance system Re1, and can obtain a charge equivalent to (Qz2*Qz1*α) by the second resonance system Re2, and can draw out the sum of these charges as power.

Assuming that Qz2=Qz1>>1, the second resonance system Re2 will generate more charge than the first resonance system Re1. Therefore, the amount of charge, that is, the power generation capacity of the second resonance system Re2 will dramatically increase (the same holds true when Qz2≠Qz1). For example, in the case of the conventional power generating element 18 described above, there is only one resonance system and, as a result, only power equivalent to that of the first resonance system Re1 of the power generating element 22 can be generated. In contrast, due to the action of the second resonance system Re2, the power generating element 22 can generate dramatically more power than the conventional power generating element 18.

The weight body 36 of the power generating element 22 may be provided on the top side instead of the bottom side of the second plate-like structure 28. In this case as well, the same operations are carried out. The weight body 36 is a member for adjusting the resonance characteristics of the two resonance systems Re1 and Re2, and may be omitted when it is possible to adjust the resonance characteristics using a different method (e.g. a method in which the spring constant is adjusted by changing the Young's modulus and/or the shape of the two plate-like structures 24 and 28). In cases where the power generation capacity of the first resonance system Re1 is smaller than the power generation capacity of the second resonance system Re2 to the point of being insignificant, the first piezoelectric element 26 may be omitted. In such a case, the manufacturing process can be simplified while ensuring power generation capacity of at least a certain level.

Figure 2B:
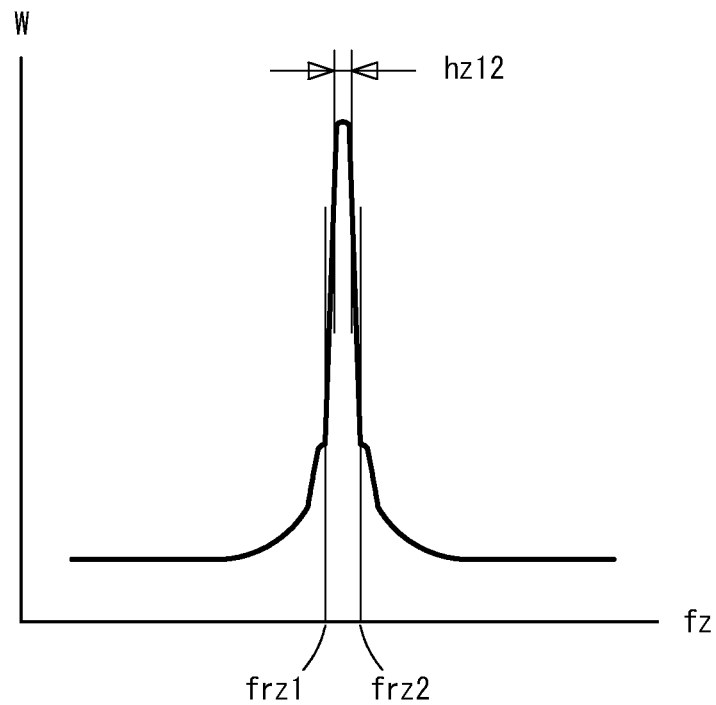
FIG. 2B is a graph illustrating power generation capacity of the first and second resonance systems of the power generating element according to the first embodiment.

Heretofore, it has been assumed that the resonance frequencies frz1 and frz2 match each other, and operations have been described for a case in which vibrations of the same frequencies as the resonance frequencies frz1 and frz2 are applied to the power generating element 22. However, manufacturing inconsistencies and the like occur when mass producing and, as such, it is difficult to accurately match the resonance frequencies frz1 and frz2. As such, the inventors carried out experiments and simulations and, as a result, discovered that, when the frequency band of the half-value width hz1 of the first resonance system. Re1 and the frequency band of the half-value width hz2 of the second resonance system Re2 at least partially overlap each other, a sufficiently high power generation capacity can be obtained in the overlapped frequency band hz12 as illustrated in FIG. 2B, which depicts the relationship between power generation capacity W and frequency fz.

As described above, the power generating element 22 includes the two mutually connected resonance systems Re1 and Re2, and is configured so that the frequency bands of the half-value widths hz1 and hz2 of the resonance characteristics overlap each other. As such, the Q of the overall resonance can be greatly increased due to the interaction between the resonance systems. Accordingly, it is possible to dramatically increase power generation capacity over that of conventional levels for vibration in the frequency bands where the half-value widths hz1 and hz2 overlap each other. Moreover, a simple structure is achieved, which enables simple manufacturing using common manufacturing processes.

Next, two modification examples of the power generating element 22 of the first embodiment will be discussed. Here, components that are the same as discussed for the power generating element 22 are assigned the same reference signs and descriptions thereof are foregone.

Figure 3A:
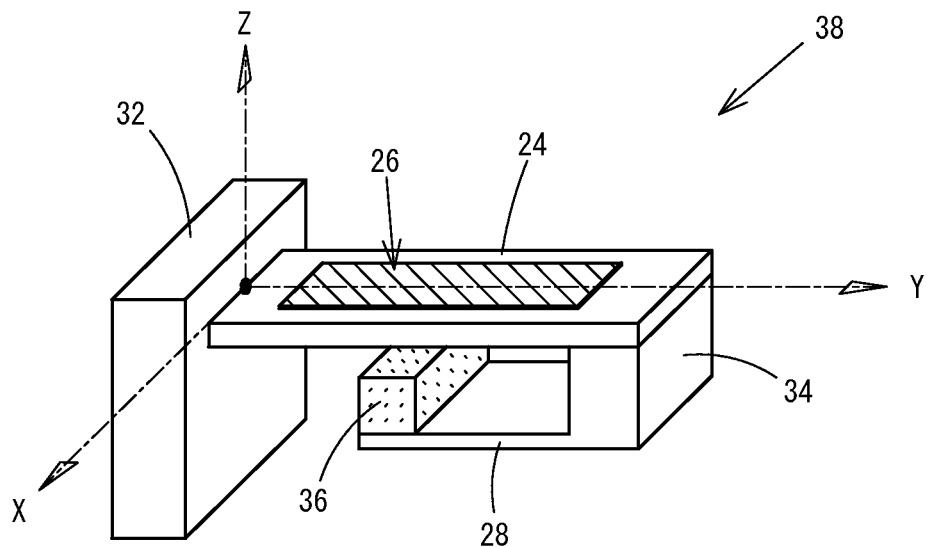
FIG. 3A is a perspective view of an appearance of a modification example of the power generating element according to the first embodiment.
Figure 3B:
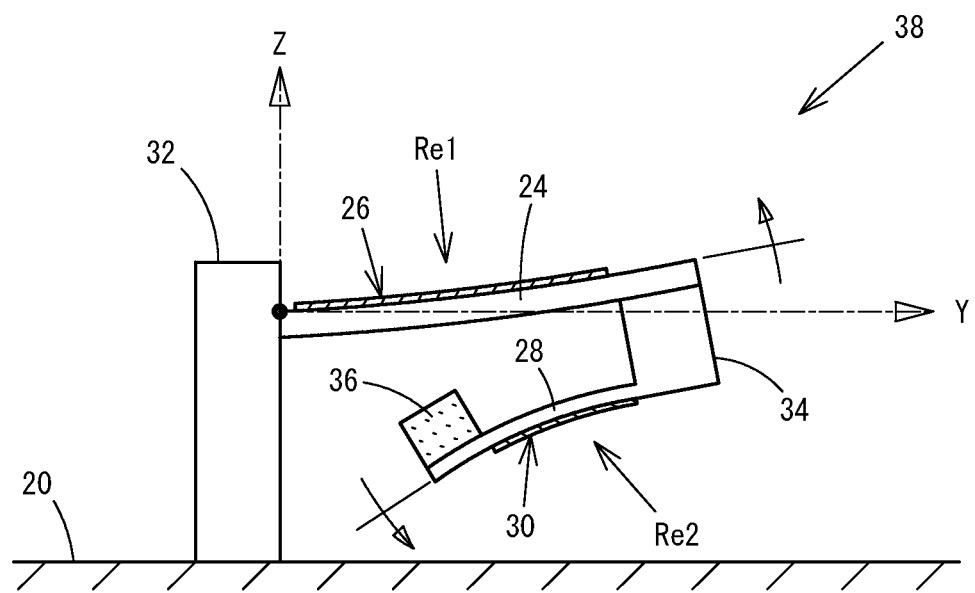
FIG. 3B is a front view illustrating operations of the modification example of the power generating element according to the first embodiment when vibration is applied in the Z-axis direction.

As illustrated in FIGS. 3A and 3B, the constituents of the first modification example, namely a power generating element 38, are the same as those for the power generating element 22 with the exception that the second plate-like structure 28 is disposed below the first plate-like structure 24. The second piezoelectric element 30 is provided on the bottom side of the second plate-like structure 28, the connection body 34 is provided on the bottom side of the tip end portion of the first plate-like structure 24, and the weight body 36 is provided on the top side of the second plate-like structure 28.

The vertical arrangement of the first and second resonance systems Re1 and Re2 in the power generating element 38 is opposite that in the power generating element 22, but the resonance characteristics of each resonance system are the same as those of the graph depicted in FIG. 2A, and the power generation performance is the same as that of the graph depicted in FIG. 2B. Accordingly, the same excellent advantageous effects that were obtained with the power generating element 22 can also be obtained with the power generating element 38. The weight body 36 of the power generating element 38 may be provided on the top side instead of the bottom side of the second plate-like structure 28. In this case as well, the same operations are carried out.

Figure 4A:
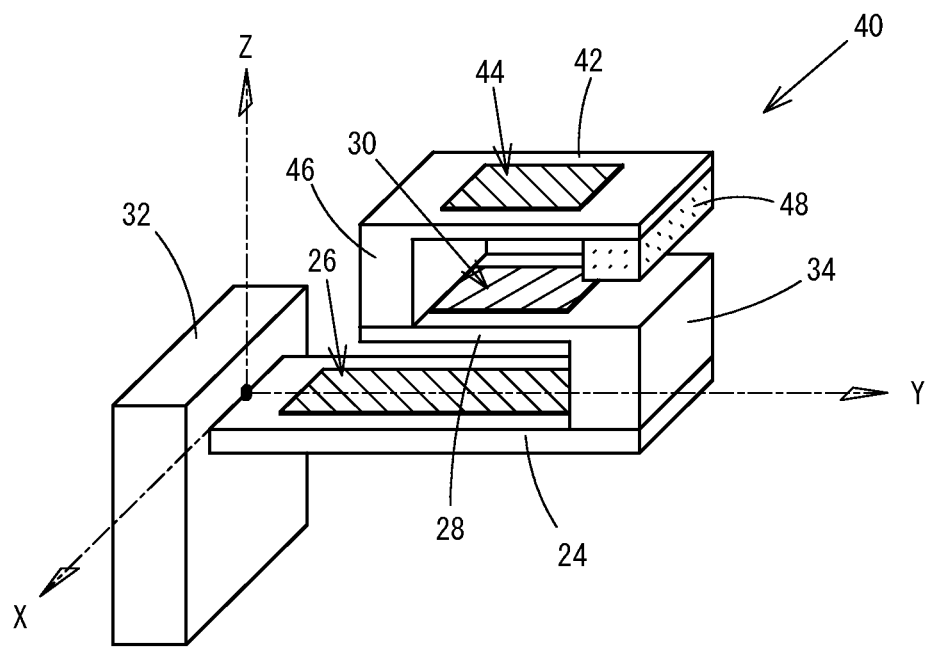
FIG. 4A is a perspective view of an appearance of another modification example of the power generating element according to the first embodiment.
Figure 4B:
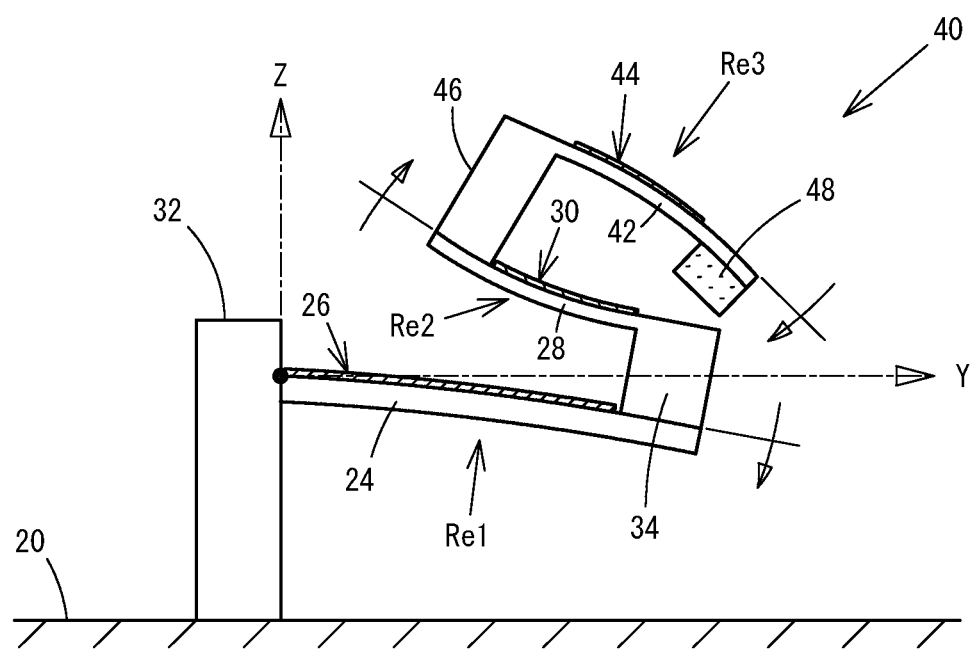
FIG. 4B is a front view illustrating operations of this modification example of the power generating element according to the first embodiment when vibration is applied in the Z-axis direction.

As illustrated in FIGS. 4A and 4B, the second modification example, namely a power generating element 40, is configured by removing the weight body 36 and adding a third plate-like structure 42, a third piezoelectric element 44, a connection body 46, and a weight body 48 to the configuration of the power generating element 22.

The third plate-like structure 42 is disposed above the second plate-like structure 28, is connected to the tip end portion of the second plate-like structure 28 via the connection body 46, and extends in a direction parallel to the Y-axis such that a direction from the base end portion toward a tip end portion of the third plate-like structure 42 is a Y-axis positive direction. The weight body 48 is provided on the tip end portion of the third plate-like structure 42. Other configurations are the same as for the power generating element 22.

Three resonance systems Re1, Re2, and Re3 are formed in the power generating element 40 by the structure described above. The first resonance system Re1 is formed on the basis of the flexibility of the first plate-like structure 24, and a resonance frequency frz1 of the Z-axis direction is set by adjusting a spring constant of the Z-axis direction of the first plate-like structure 24 and the masses of the members (the masses of the connection body 34, the second plate-like structure 28, the connection body 46, the third plate-like structure 42, and the weight body 48) connected to the tip end portion of the first plate-like structure 24.

The second resonance system Re2 is formed on the basis of the flexibility of the second plate-like structure 28, and a resonance frequency frz2 of the Z-axis direction is set by adjusting a spring constant of the Z-axis direction of the second plate-like structure 28 and the masses of the members (the masses of the connection body 46, the third plate-like structure 42, and the weight body 48) connected to the tip end portion of the second plate-like structure 28.

The third resonance system Re3 is formed on the basis of the flexibility of the third plate-like structure 42, and a resonance frequency frz3 of the Z-axis direction is set by adjusting a spring constant of the Z-axis direction of the third plate-like structure 42 and the mass of the member (the mass of the weight body 48) connected to the tip end portion of the third plate-like structure 42. The weight body 48 is a member for adjusting resonance characteristics, and may be omitted when it is possible to adjust the resonance characteristics using a different method (e.g. a method in which the spring constant is adjusted by changing the Young's modulus and/or the shape of the three plate-like structures 24, 28, and 42).

Figure 5A:
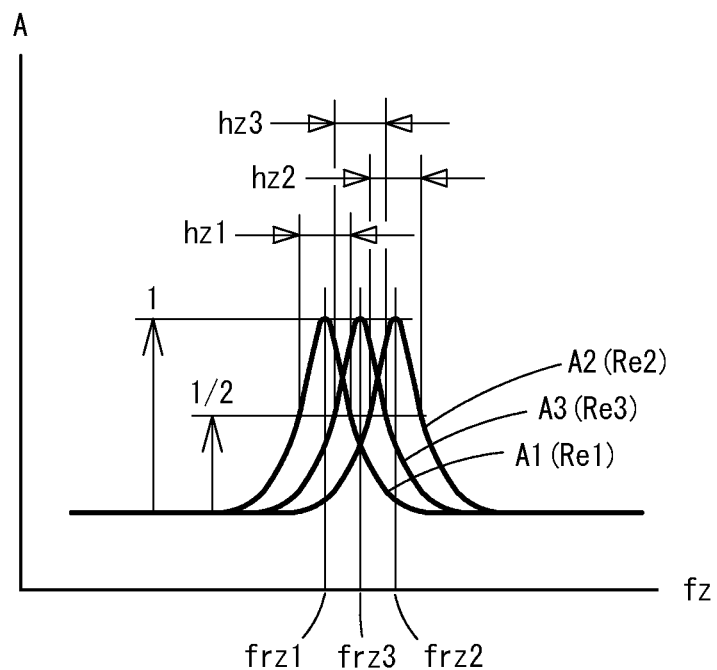
FIG. 5A is a graph illustrating an example of the resonance characteristics of the Z-axis direction of first to third resonance systems of the power generating element illustrated in FIGS. 4A and 4B.

The resonance characteristics of the three resonance systems Re1, Re2, and Re3 are set, for example, as illustrated in FIG. 5A, which depicts the relationship between frequency fz and amplitude A. The resonance characteristics of the second resonance system Re2 illustrated in FIG. 5A assume a state in which the base end portion of the second plate-like structure 28 is directly connected to the pedestal 32, and do not include interaction with the other resonance systems. Likewise, the resonance characteristics of the third resonance system. Re3 assume a state in which the base end portion of the third plate-like structure 42 is directly connected to the pedestal 32, and do not include interaction with the other resonance systems.

In the three resonance systems Re1, Re2, and Re3, a portion of the frequency band of the half-value width hz1 of the first resonance system Re1 overlaps a portion of the frequency band of the half-value width hz3 of the third resonance system Re3, and a portion of the frequency band of the half-value width hz2 of the second resonance system Re2 also overlaps a portion of the frequency band of the half-value width hz3 of the third resonance system re3. Note that the frequency bands of the half-value widths hz1 and hz2 do not overlap.

Figure 5B:
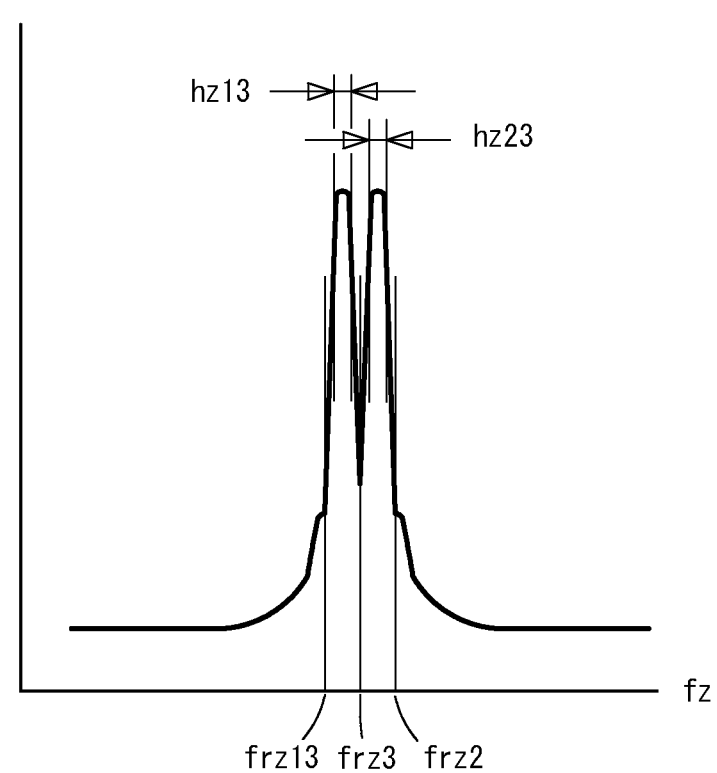
FIG. 5B is a graph illustrating the power generation capacity of the first to third resonance systems of the power generating element illustrated in FIGS. 4A and 4B.

The resonance characteristics of each resonance system are set as illustrated in FIG. 5A and, as such, the power generating element 40 can achieve high power generation capacity as described above in the overlapping frequency bands hz13 and hz23 as illustrated in FIG. 5B, which depicts the relationship between power generation capacity W and frequency fz. Furthermore, a configuration is possible in which the frequency bands of the half-value widths hz1 and hz2 overlap and, in such a case, there will be one frequency band demonstrating a peak in power generation capacity, and the peak value of power generation capacity will be higher.

Figure 6A:
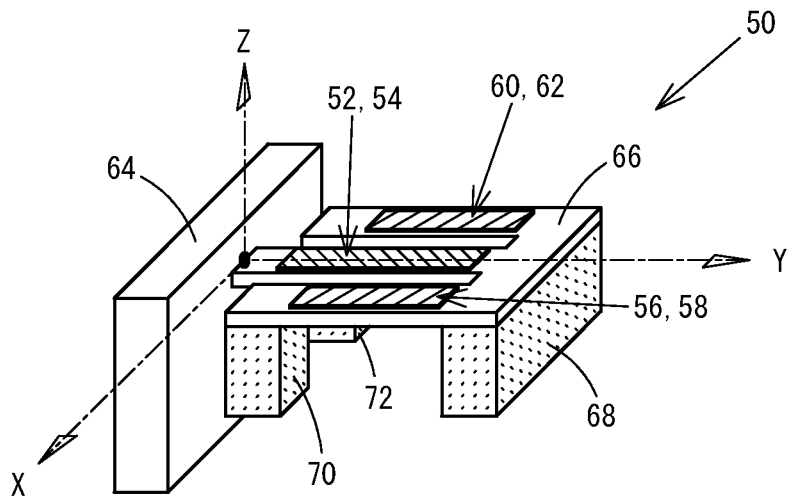
FIG. 6A is a perspective view of an appearance of a power generating element according to a second embodiment of the invention.

Next, a second embodiment of the power generating element of the invention will be described while referencing FIGS. 6A to 8B. As illustrated in FIG. 6A, a power generating element 50 according to this embodiment includes a first plate-like structure 52 having flexibility, a first piezoelectric element 54 that generates a charge on the basis of a deflection of the first plate-like structure 52, a second plate-like structure 56 having flexibility, a second piezoelectric element 58 that generates a charge on the basis of a deflection of the second plate-like structure 56, a third plate-like structure 60 having flexibility, and a third piezoelectric element 62 that generates a charge on the basis of a deflection of the third plate-like structure 60. The power generating element 50 also includes a pedestal 64 that supports the first plate-like structure 52 as a cantilevered structure. The power generating element 50 is used by attaching the pedestal 64 to a vibration source 20. In an XYZ three-dimensional coordinate system, the plate surfaces of the plate-like structures 52, 56, and 60 are disposed on planes parallel to the XY plane. It is preferable that the planes parallel to the XY plane are the same plane.

A base end portion of the first plate-like structure 52 is directly connected to the pedestal 64, and the first plate-like structure 52 extends in a direction parallel to the Y-axis such that a direction from the base end portion toward a tip end portion of the first plate-like structure 52 is a Y-axis positive direction. The second and third plate-like structures 56 and 60 are disposed beside the first plate-like structure 52 such that the first plate-like structure 52 is sandwiched between the second and third plate-like structures 56 and 60. Base end portions of the second and third plate-like structures 56 and 60 are connected to the tip end portion of the first plate-like structure 52 via a connection body 66, and the second and third plate-like structures 56 and 60 extend in a direction parallel to the Y-axis such that a direction from the base end portions toward tip end portions of the second and third plate-like structures 56 and 60 is a Y-axis negative direction. Additionally, a weight body 68 is provided on the bottom side of the connection body 66, a weight body 70 is provided on the bottom side of the tip end portion of the second plate-like structure 56, and a weight body 72 is provided on the bottom side of the tip end portion of the third plate-like structure 60.

Figure 7B:
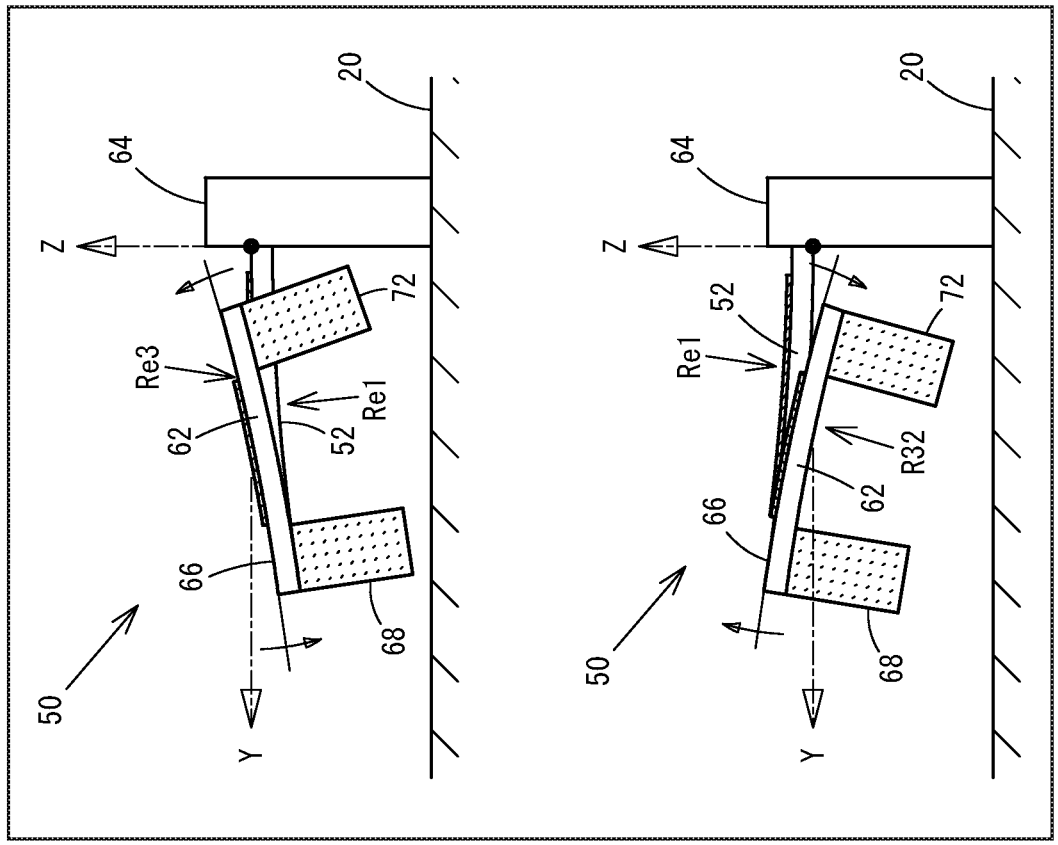
FIG. 7B is a back view illustrating operations of the power generating element according to the second embodiment when vibration is applied in the Z-axis direction.
Figure 7A:
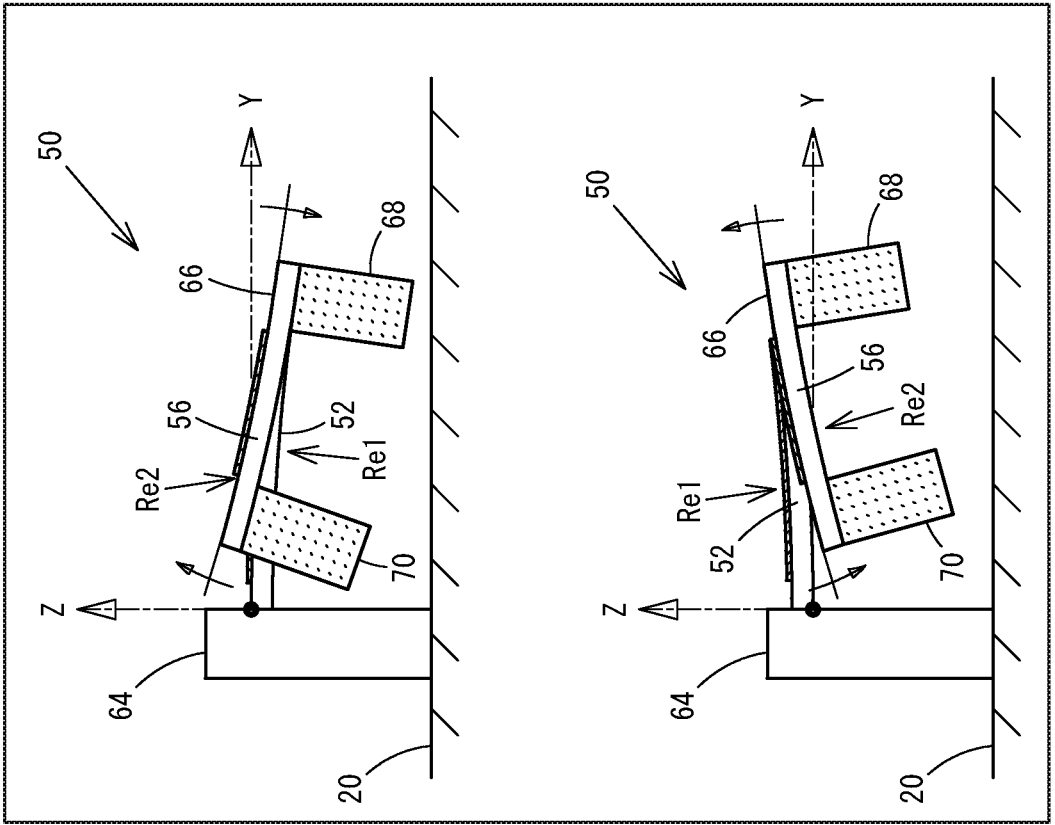
FIG. 7A is a front view illustrating operations of the power generating element according to the second embodiment when vibration is applied in the Z-axis direction.

Accordingly, when vibration in the Z-axis direction is applied to the pedestal 64 and the first plate-like structure 52 deflects in the thickness direction, the second plate-like structure 56 deflects in the opposite direction of the first plate-like structure 52, as illustrated in FIG. 7A. Likewise, when the first plate-like structure 52 deflects in the thickness direction, the third plate-like structure 60 deflects in the opposite direction of the first plate-like structure 52, as illustrated in FIG. 7B.

As with the piezoelectric element 12 illustrated in FIG. 14B, the first, second, and third piezoelectric elements 54, 58, and 62 respectively include a lower electrode layer G, a piezoelectric material layer P, and an upper electrode layer E.

Three resonance systems Re1, Re2, and Re3 are formed in the power generating element 50 by the structure described above. The first resonance system Re1 is formed on the basis of the flexibility of the first plate-like structure 52, and a resonance frequency frz1 of the Z-axis direction is set by adjusting a spring constant of the Z-axis direction of the first plate-like structure 52 and the masses of the members (the masses of the connection body 66, the second and third plate-like structures 56 and 60, and the weight bodies 68, 70, and 72) connected to the tip end portion of the first plate-like structure 52.

The second resonance system Re2 is formed on the basis of the flexibility of the second plate-like structure 56, and a resonance frequency frz2 of the Z-axis direction is set by adjusting a spring constant of the Z-axis direction of the second plate-like structure 28 and the mass of the member (the mass of the weight body 70) connected to the tip end portion of the second plate-like structure 56.

The third resonance system Re3 is formed on the basis of the flexibility of the third plate-like structure 60, and a resonance frequency frz3 of the Z-axis direction is set by adjusting a spring constant of the Z-axis direction of the third plate-like structure 60 and the mass of the member (the mass of the weight body 72) connected to the tip end portion of the third plate-like structure 60. The weight bodies 68, 70, and 72 are members for adjusting resonance characteristics, and may be omitted when it is possible to adjust the resonance characteristics using a different method (e.g. a method in which the spring constant is adjusted by changing the Young's modulus and/or the shape of the three plate-like structures 52, 56, and 60).

Figure 8A:
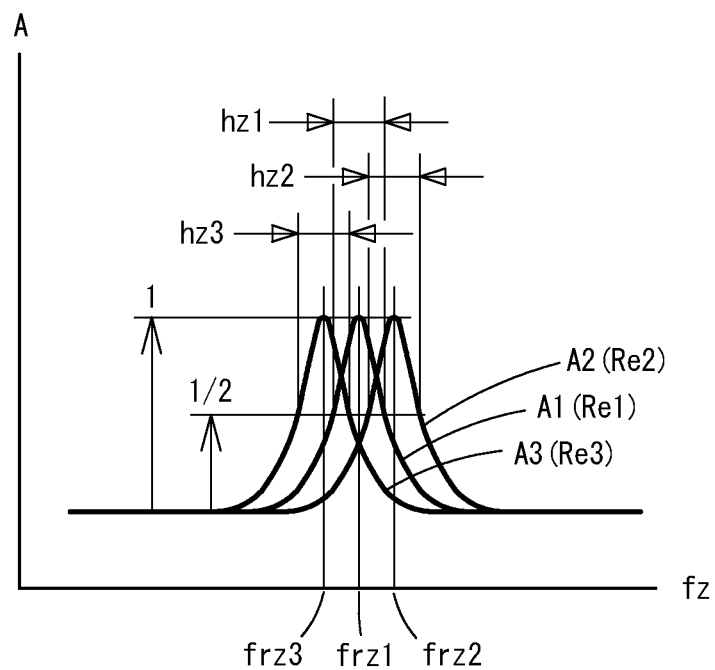
FIG. 8A is a graph illustrating an example of the resonance characteristics of the Z-axis direction of first to third resonance systems of the power generating element according to the second embodiment.

The resonance characteristics of the three resonance systems Re1, Re2, and Re3 are set, for example, as illustrated in FIG. 8A, which depicts the relationship between frequency fz and amplitude A. In the three resonance systems Re1, Re2, and Re3, a portion of the frequency band of the half-value width hz2 of the second resonance system Re2 overlaps a portion of the frequency band of the half-value width hz1 of the first resonance system Re1, and a portion of the frequency band of the half-value width hz3 of the third resonance system Re3 also overlaps a portion of the frequency band of the half-value width hz1 of the first resonance system Re1. Note that the frequency bands of the half-value widths hz2 and hz3 do not overlap.

Figure 8B:
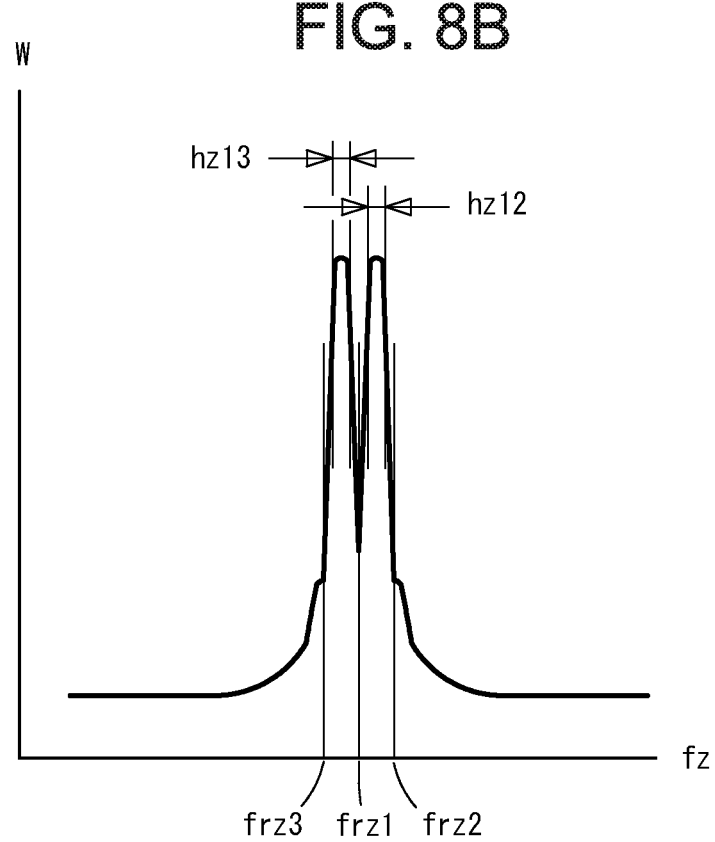
FIG. 8B is a graph illustrating power generation capacity of the first to third resonance systems of the power generating element according to the second embodiment.

The resonance characteristics of each resonance system are set as illustrated in FIG. 8A and, as such, the power generating element 50 can achieve high power generation capacity in the overlapping frequency bands hz13 and hz12 as illustrated in FIG. 8B, which depicts the relationship between power generation capacity W and frequency fz. A configuration is also possible in which the frequency bands of the half-value widths hz1 and hz2 overlap and, in such a case, there will be one frequency band demonstrating a peak in power generation capacity, but the peak value of power generation capacity will be higher.

The power generating element 40 illustrated in FIGS. 4A and 4B described above also includes three resonance systems, but in the case of the power generating element 40, the three resonance systems are sequentially arranged in series and, as such, interaction occurs between the two resonance systems Re1 and Re3 that are not directly connected to each other. In contrast, with the power generating element 50, the first and second resonance systems Re1 and Re2 are connected in series and the first and third resonance systems Re1 and Re3 are connected in series, but the second and third resonance systems Re2 and Re3 are not connected in series. As such, almost no interaction occurs between the two resonance systems Re2 and Re3 that are not directly connected to each other. Accordingly, the power generating element 50 performs substantially the same operations as when using two of the power generating elements 22 (FIG. 1) in parallel.

The power generating element 50 can achieve greater power generation capacity than the conventional power generating element 22. In the case of the power generating element 22, the plate-like structures 24 and 28 are disposed so as to vertically overlap and, as a result, easily contact each other. However, with the power generating element 50, the plate-like structures 52, 56, and 60 are disposed so as not to overlap in the vertical direction, and have a structure that prevents the plate-like structures 52, 56, and 60 from contacting each other. As such, maximum amounts of deflection of the plate-like structures 52, 56, and 60 can be increased, and the power generation capacity can be increased even more.

Figure 9A:
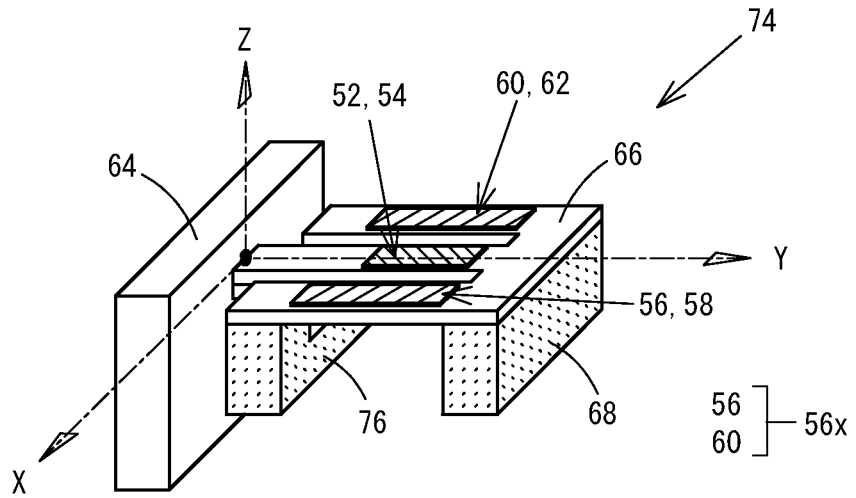
FIG. 9A is a perspective view of an appearance of a modification example of the power generating element according to the second embodiment.
Figure 9B:
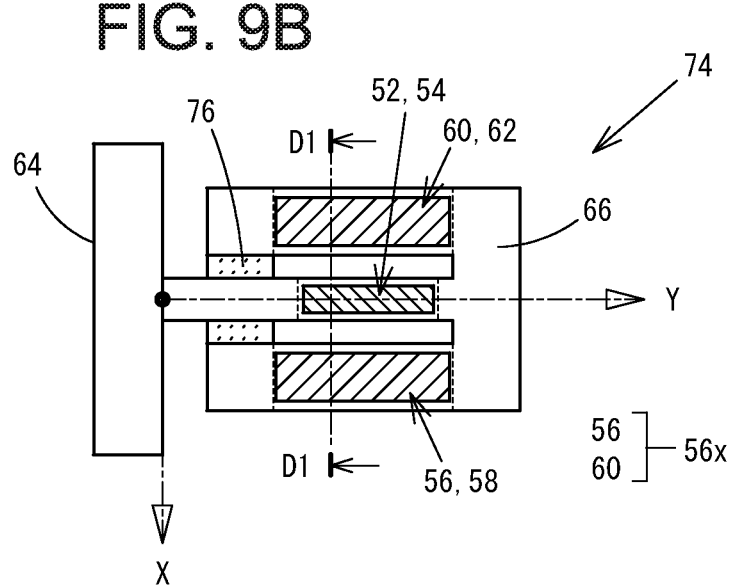
FIG. 9B is a plan view of this modification example of the power generating element according to the second embodiment.
Figure 9C:
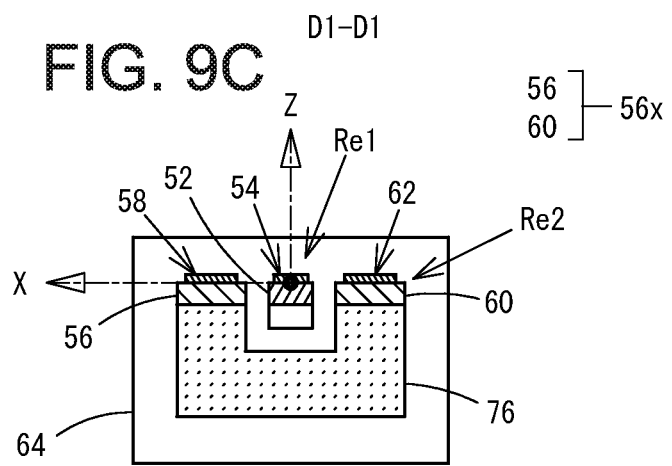
FIG. 9C is a front view of this modification example of the power generating element according to the second embodiment.

Next, a modification example of the power generating element 50 of the second embodiment, namely a power generating element 74, will be described while referencing FIGS. 9A to 9C. Here, components that are the same as discussed for the power generating element 50 are assigned the same reference signs and descriptions thereof are foregone. The power generating element 74 is configured by removing the weight bodies 70 and 72 and adding a U-shaped weight body 76 to the configuration of the power generating element 50. Other configurations are the same as for the power generating element 50.

The weight body 76 has a groove shape obtained by, for example, joining and integrating the tip end portions of the weight bodies 70 and 72 using a cross beam. Accordingly, the plate-like structures 56 and 60 have a form that is joined via the weight body 76, and the two plate-like structures 56 and 60 cooperate to perform the role of the second plate-like structure (one plate-like structure). In the following description, a constituent obtained by combining the characteristics of the two plate-like structures 56 and 60 will be referred to as a "second plate-like structure 56*x*."

Two resonance systems Re1 and Re2 are formed in the power generating element 74 by the structure described above. The first resonance system Re1 is formed on the basis of the flexibility of the first plate-like structure 52, and a resonance frequency frz1 of the Z-axis direction is set by adjusting a spring constant of the Z-axis direction of the first plate-like structure 52 and the masses of the members (the masses of the connection body 66, the weight body 68, the second plate-like structure 56x, and the weight body 76) connected to the tip end portion of the first plate-like structure 52.

The second resonance system Re2 is formed on the basis of the flexibility of the second plate-like structure 56x, and a resonance frequency frz2 of the Z-axis direction is set by adjusting a spring constant of the Z-axis direction of the second plate-like structure 56x and the mass of the member (the mass of the weight body 76) connected to the tip end portion of the second plate-like structure 56x.

The resonance characteristics of each resonance system are the same as those of the graph of the power generating element 22 illustrated in FIG. 2A. Accordingly, the power generating element 74 can also perform the same operations as the power generating element 22 and obtain the same excellent advantageous effects as the power generating element 50.

Figure 10A:
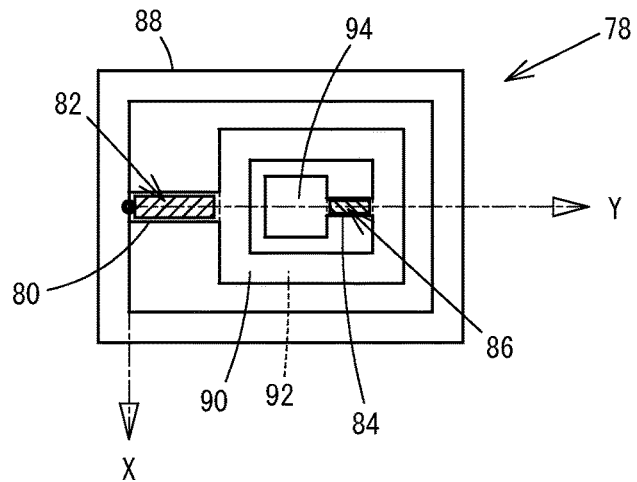
FIG. 10A is a plan view of an appearance of a power generating element according to a third embodiment of the invention.

Next, a third embodiment of the power generating element of the invention will be described while referencing FIGS. 10A to 10C. A power generating element 78 according to this embodiment includes a first plate-like structure 80 having flexibility, a first piezoelectric element 82 that generates a charge on the basis of a deflection of the first plate-like structure 80, a second plate-like structure 84 having flexibility, a second piezoelectric element 86 that generates a charge on the basis of a deflection of the second plate-like structure 84, and a pedestal 88 that supports the first plate-like structure 80 as a cantilevered structure. The power generating element 78 is used by attaching the pedestal 88 to a vibration source 20. In an XYZ three-dimensional coordinate system, the plate surfaces of the plate-like structures 80 and 84 are disposed on planes parallel to the XY plane. It is preferable that the planes parallel to the XY plane are the same plane.

The pedestal 88 has a rectangular tube-like shape and is disposed so as to surround the other members. A base end portion of the first plate-like structure 80 is directly connected to an inner wall of the pedestal 88, and the first plate-like structure 80 extends in a direction parallel to the Y-axis such that a direction from the base end portion toward a tip end portion of the first plate-like structure 80 is a Y-axis positive direction. A connection body 90 having a rectangular frame-like shape extends in the Y-axis positive direction at the tip end portion of the first plate-like structure 80.

The second plate-like structure 84 is positioned inward of the connection body 90 and a base end portion of the second plate-like structure 84 is connected to an inner edge (inner edge of the side opposite the portion where the first plate-like structure 80 is connected) of the connection body 90. That is, the second plate-like structure 84 is connected to the first plate-like structure 80 via the connection body 90, and the second plate-like structure 84 extends in a direction parallel to the Y-axis such that a direction from the base end portion toward a tip end portion of the second plate-like structure 84 is the Y-axis negative direction. Additionally, a weight body 92 having a rectangular tube-like shape of the same size as the connection body 90 is provided on the bottom side of the connection body 90, and a weight body 94 is provided on the bottom side of the tip end portion of the second plate-like structure 84, so as to surround the weight body 92. Accordingly, when vibration in the Z-axis direction is applied to the pedestal 88 and the first plate-like structure 80 deflects in the thickness direction, the second plate-like structure 84 deflects in the opposite direction of the first plate-like structure 80.

As with the piezoelectric element 12 illustrated in FIG. 14B, the first and second piezoelectric elements 82 and 86 respectively include a lower electrode layer G, a piezoelectric material layer P, and an upper electrode layer E.

Two resonance systems Re1 and Re2 are formed in the power generating element 78 by the structure described above. The first resonance system Re1 is formed on the basis of the flexibility of the first plate-like structure 80, and a resonance frequency frz1 of the Z-axis direction is set by adjusting a spring constant of the Z-axis direction of the first plate-like structure 80 and the masses of the members (the masses of the connection body 90, the weight body 92, the second plate-like structure 84, and the weight body 94) connected to the tip end portion of the first plate-like structure 80.

The second resonance system Re2 is formed on the basis of the flexibility of the second plate-like structure 84, and a resonance frequency frz2 of the Z-axis direction is set by adjusting a spring constant of the Z-axis direction of the second plate-like structure 84 and the mass of the member (the mass of the weight body 94) connected to the tip end portion of the second plate-like structure 84. The weight bodies 92 and 94 are members for adjusting resonance characteristics, and may be omitted when it is possible to adjust the resonance characteristics using a different method (e.g. a method in which the spring constant is adjusted by changing the Young's modulus and/or the shape of the two plate-like structures 80 and 84).

The resonance characteristics of each resonance system are the same as those of the graph of the power generating element 22 illustrated in FIG. 2A, and the same advantageous effects that were obtained with the power generating element 22 can also be obtained with the power generating element 78. Furthermore, with the power generating element 78, the pedestal 88 can be made to act as a stopper that prevents the weight body 92 from excessively displacing, and the weight body 92 can be made to act as a stopper that prevents the weight body 94 from excessively displacing. As such, the first and second plate-like structures 80 and 84 can be easily protected from damage when the power generating element 74 is subjected to a strong impact. The tip end portion of the first plate-like structure 80 and the base end portion of the second plate-like structure 84 are connected to the respective end portions of the connection body 90 (at mutually separated positions) and, as such, greater acceleration can be applied to the second resonance system Re2.

Next, two modification examples of the power generating element 78 of the third embodiment will be discussed. Here, components that are the same as discussed for the power generating element 78 are assigned the same reference signs and descriptions thereof are foregone.

Figures 11A, 11B:
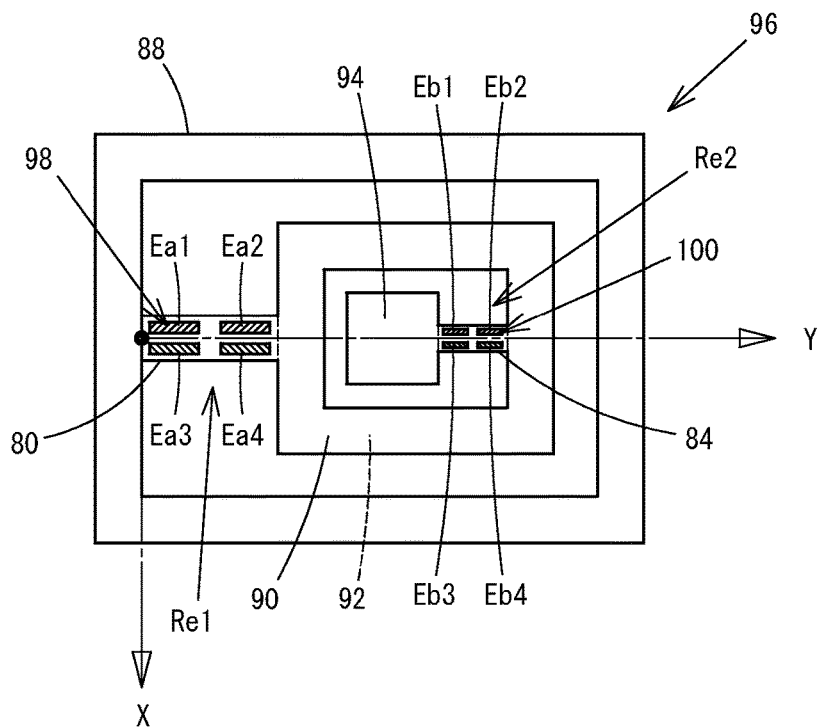
FIG. 11A is a plan view of an appearance of a modification example of the power generating element according to the third embodiment.
FIG. 11B is a table detailing the polarity of the output of each piezoelectric element with respect to the vibration to be applied.

As illustrated in FIG. 11A, a power generating element 96 of a first modification example has the same configuration as the power generating element 78, with the exceptions that the first piezoelectric element 82 of the power generating element 78 is replaced with a first piezoelectric element 98, and the second piezoelectric element 86 is replaced with a second piezoelectric element 100.

With the power generating element 78 described above, the first piezoelectric element 82 is configured from one piezoelectric element, the second piezoelectric element 86 is configured from one piezoelectric element, and only vibration in the Z-axis direction can be converted to electric energy. In contrast, with the power generating element 96, the first piezoelectric element 98 is configured from four piezoelectric elements Ea1 to Ea4, the second piezoelectric element 100 is configured from four piezoelectric elements Eb1 to Eb4, and vibration in all of the X-, Y-, and Z-axis directions can be converted to electric energy.

Figure 10B:
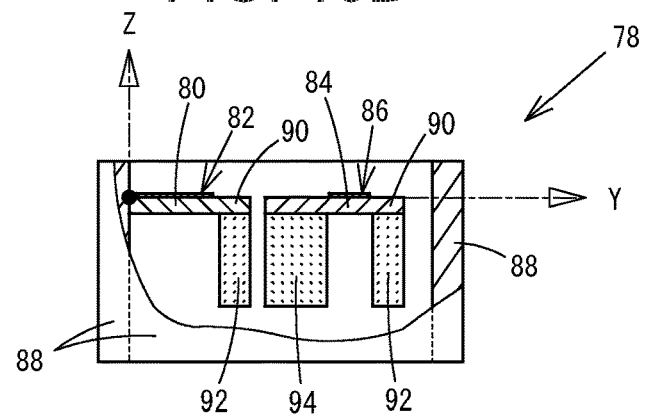
FIG. 10B is a partial cross-sectional view of the power generating element according to the third embodiment, viewed from the front.
Figure 10C:
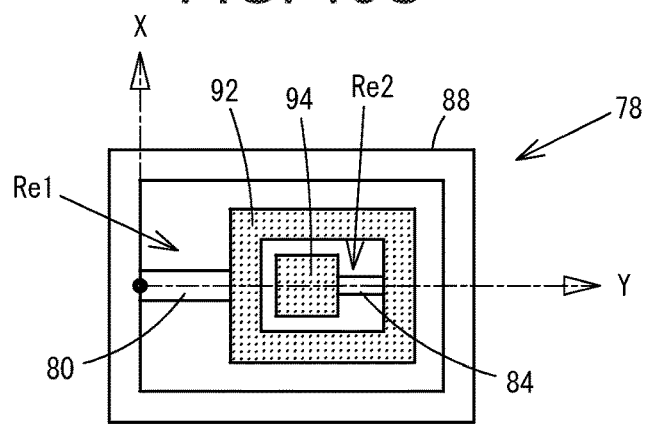
FIG. 10C is a bottom view of the power generating element according to the third embodiment.

The fundamental structure of the power generating element 96 is the same as that of the power generating element 78 and, as illustrated in FIG. 10B, centers of gravity of the weight bodies 92 and 94 are arranged at lower positions than the tip end portions of the first and second plate-like structures 80 and 84. As such, when vibration in each of the X- and Y-axis directions is applied to the weight bodies 92 and 94, bending moments act on the first and second plate-like structures 80 and 84. Moreover, the first and second plate-like structures 80 and 84 deflect and, as illustrated in FIG. 11B, positive or negative charges are generated in each of the eight piezoelectric elements Ea1 to Ea4 and Eb1 to Eb4. Accordingly, in addition to vibration in the Z-axis direction, vibration in the X- and Y-axis directions can be converted to electric energy. In FIG. 11B, the + and − symbols represent the relative polarity of the charge generated in each of the piezoelectric elements. However, the + and − symbols may be reversed.

The first resonance system Re1 of the power generating element 96 includes not only the half-value width hz1 and the resonance frequency frz1 of the Z-axis direction, but also a half-value width hx1 and a resonance frequency frx1 of the X-axis direction, and a half-value width hy1 and a resonance frequency fry1 of the Y-axis direction. Likewise, the second resonance system Re2 includes not only the half-value width hz2 and the resonance frequency frz2 of the Z-axis direction, but also a half-value width hx2 and a resonance frequency frx2 of the X-axis direction, and a half-value width hy2 and a resonance frequency fry2 of the Y-axis direction.

Figure 12A:
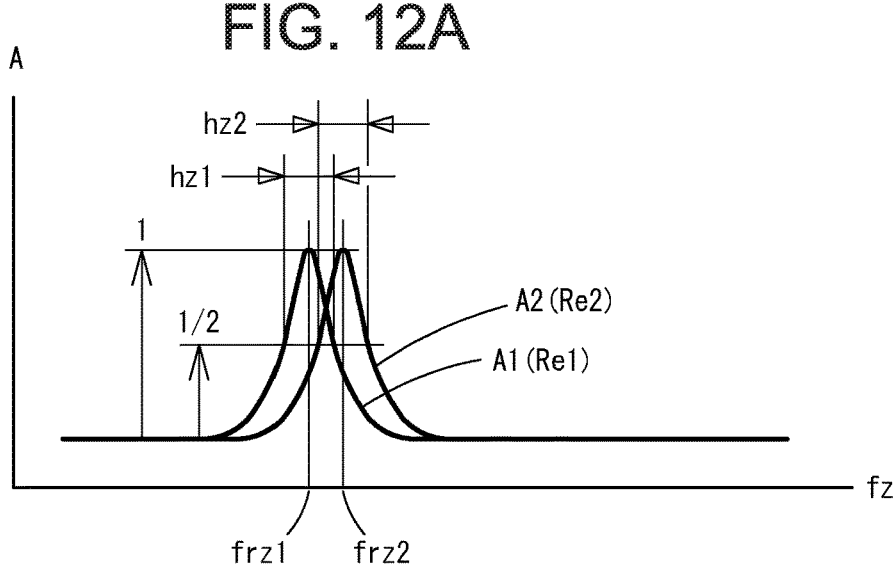
FIG. 12A is a graph illustrating the resonance characteristics of the Z-axis direction of the first and second resonance systems of the power generating element illustrated in FIG. 11A.

As illustrated in FIG. 12A, which depicts the relationship between frequency fz and amplitude A, the Z-axis direction is set such that a portion of the frequency band of the half-value width hz2 overlaps a portion of the frequency band of the half-value width hz1. Accordingly, high power generation capacity can be achieved in the overlapping frequency bands due to the interaction between the two resonance systems Re1 and Re2.

Figure 12B:
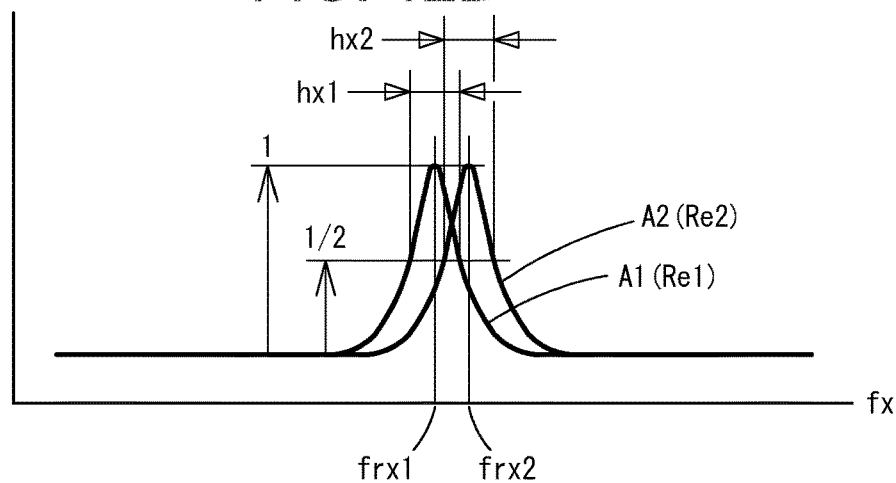
FIG. 12B is a graph illustrating the resonance characteristics of the X-axis direction of the first and second resonance systems of the power generating element illustrated in FIG. 11A.

Likewise, as illustrated in FIG. 12B, the X-axis direction is set such that a portion of the frequency band of the half-value width hx2 overlaps a portion of the frequency band of the half-value width hx1. Accordingly, high power generation capacity can be achieved in the overlapping frequency bands due to the interaction between the two resonance systems Re1 and Re2.

Figure 12C:
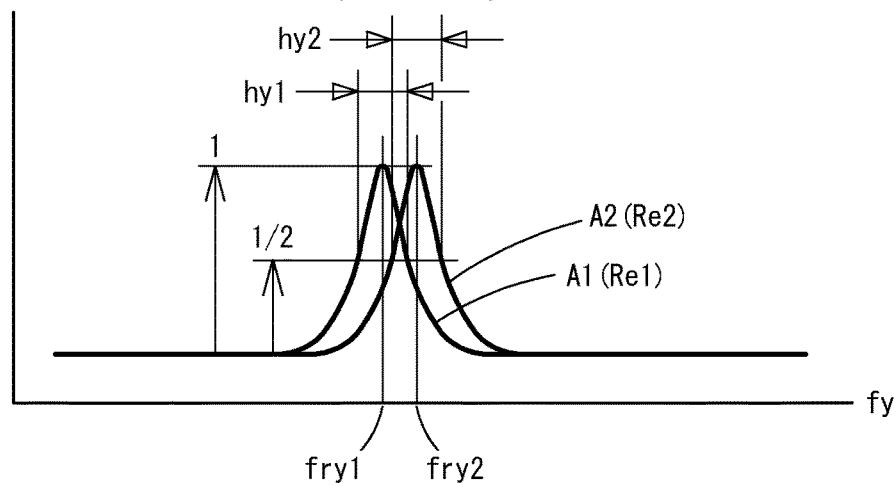
FIG. 12C is a graph illustrating the resonance characteristics of the Y-axis direction of the first and second resonance systems of the power generating element illustrated in FIG. 11A.

Likewise, as illustrated in FIG. 12C, the Y-axis direction is set such that a portion of the frequency band of the half-value width hy2 overlaps a portion of the frequency band of the half-value width hy1. Accordingly, high power generation capacity can be achieved in the overlapping frequency bands due to the interaction between the two resonance systems Re1 and Re2.

Thus, the power generating element 96 enables the efficient conversion of vibration in all of X-, Y, and Z-axis directions to electric energy and, as a result, the power generating element 96 can achieve greater power generation capacity than the power generating element 78.

Figures 13A, 13B:
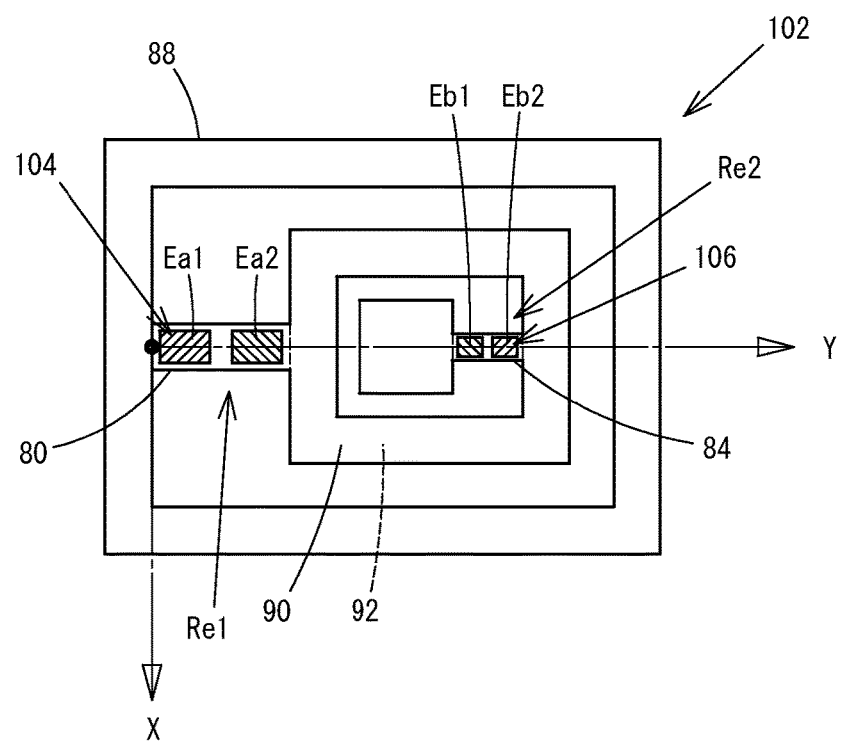
FIG. 13A is a plan view of an appearance of another modification example of the power generating element according to the third embodiment.
FIG. 13B is a table detailing the polarity of the output of each piezoelectric element with respect to the vibration to be applied.

As illustrated in FIG. 13A, a power generating element 102 of a second modification example has the same configuration as the power generating element 78, with the exceptions that the first piezoelectric element 82 of the power generating element 78 is replaced with a first piezoelectric element 104, and the second piezoelectric element 86 is replaced with a second piezoelectric element 106.

With the power generating element 78 described above, the first piezoelectric element 82 is configured from one piezoelectric element, the second piezoelectric element 86 is configured from one piezoelectric element, and only vibration in the Z-axis direction can be converted to electric energy. In contrast, with the power generating element 102, the first piezoelectric element 104 is configured from two piezoelectric elements Ea1 and Ea2, the second piezoelectric element 106 is configured from two piezoelectric elements Eb1 and Eb2, and vibration in two axial directions, namely the Y-axis direction and the Z-axis direction can be converted to electric energy.

As described above, when vibration in the Y-axis directions is applied to the weight bodies 92 and 94 of the power generating element 102, bending moments act on the first and second plate-like structures 80 and 84. Moreover, the first and second plate-like structures 80 and 84 deflect and, as illustrated in FIG. 13B, positive or negative charges are generated in each of the four piezoelectric elements Ea1, Ea2, Eb1, and Eb2. Accordingly, in addition to vibration in the Z-axis direction, vibration in the Y-axis direction can be converted to electric energy.

The first resonance system Re1 of the power generating element 102 includes not only the half-value width hz1 and the resonance frequency frz1 of the Z-axis direction, but also a half-value width hx1 and a resonance frequency frx1 of the X-axis direction, and a half-value width hy1 and a resonance frequency fry1 of the Y-axis direction. Likewise, the second resonance system Re2 includes not only the half-value width hz2 and the resonance frequency frz2 of the Z-axis direction, but also a half-value width hx2 and a resonance frequency frx2 of the X-axis direction, and a half-value width hy2 and a resonance frequency fry2 of the Y-axis direction. This is the same as for the power generating element 96.

As with the power generating element 96, the Z-axis direction is set such that a portion of the frequency band of the half-value width hz2 overlaps a portion of the frequency band of the half-value width hz1 (FIG. 12A). Accordingly, high power generation capacity can be achieved in the overlapping frequency bands due to the interaction between the two resonance systems Re1 and Re2.

As with the power generating element 96, the Y-axis direction is set such that a portion of the frequency band of the half-value width hy2 overlaps a portion of the frequency band of the half-value width hy1 (FIG. 12C). Accordingly, high power generation capacity can be achieved in the overlapping frequency bands due to the interaction between the two resonance systems Re1 and Re2.

However, the resonance characteristics of the X-axis direction are not particularly important and the frequency band of the half-value width hx2 need not overlap the frequency band of the half-value width hx1. This is because the power generating element 102 does not generate power in the X-axis direction.

The power generating element 102 enables the efficient conversion of vibration in two axial directions, namely the Y-axis direction and the Z-axis direction, to electric energy and, as a result, the power generating element 96 can achieve greater power generation capacity than the power generating element 78. When designing the first and second resonance systems Re1 and Re2, in the case of the power generating element 96, the resonance characteristics of three directions must be considered, but in the case of the power generating element 102, only two directions need to be considered. As such design is easier for the power generating element 102.

The power generating element of the invention is not limited to the embodiments and modification example described above. For example, with the power generating element 40 illustrated in FIG. 4, three plate-like structures are connected in series to provide three resonance systems, but the number of plate-like structures arranged in series and the number of resonance systems may be increased to exponentially increase the power generation capacity. In such a case, as in the embodiments described above, the odd numbered plate-like structures are disposed such that the direction from the base end portion toward the tip end portion is the Y-axis positive direction, and the even numbered plate-like structures are disposed such that the direction from the base end portions toward the tip end portions is the Y-axis negative direction. When first to $n_{th}$ plate-like structures are arranged in series, first to $n_{th}$ resonance systems are formed and, when the frequency bands of the half-value widths of the resonance systems overlap, power generation capacity is greatest in the $n_{th}$ resonance system, which is farthest from the pedestal. Accordingly, causing interaction between the $n_{th}$ resonance system and the other resonance systems is important in the increasing of the power generation capacity and, as such, it is preferable that a configuration be adopted in which the frequency band of the half-value width of the $n_{th}$ resonance system overlaps the frequency bands of the half-value widths of the other resonance systems (as many of the other resonance systems as possible).

Figure 6B:
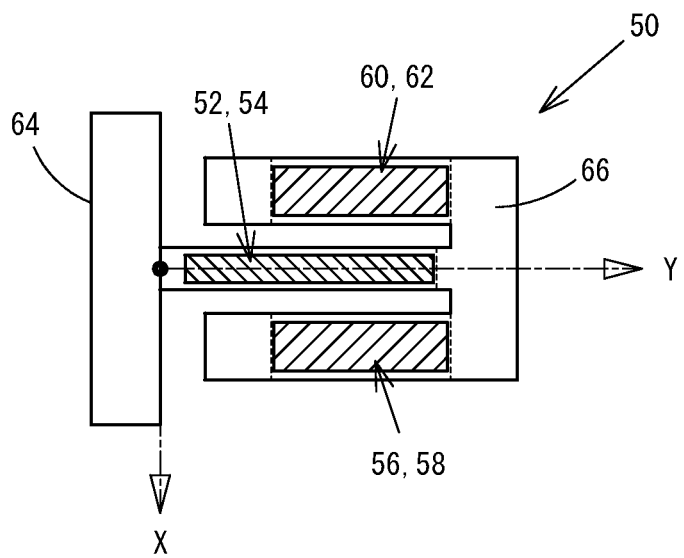
FIG. 6B is a plan view of the power generating element according to the second embodiment.
Figure 6C:
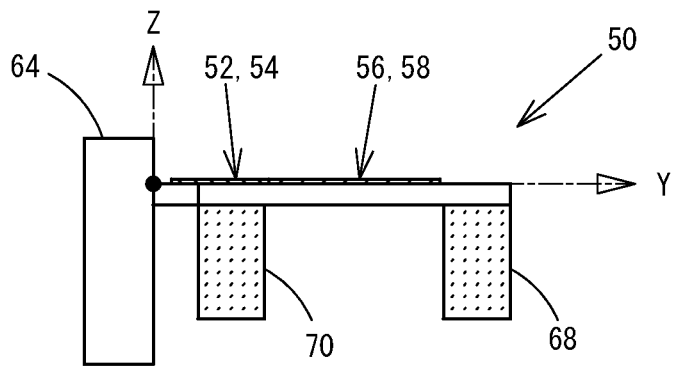
FIG. 6C is a front view of the power generating element according to the second embodiment.

With the power generating element 50 illustrated in FIGS. 6A to 6C, two other plate-like structures are connected to the tip end portion of the first plate-like structure to provide three resonance systems, but the number of the other plate-like structures may be increased to increase the number of resonance systems and, thereby further increase the power generation capacity. In such a case, as in the embodiments described above, the first plate-like structure is disposed such that the direction from the base end portion toward the tip end portion is the Y-axis positive direction, and the other plate-like structures are disposed such that the direction from the base end portions toward the tip end portions is the Y-axis negative direction. Causing interaction between the first resonance system and the other resonance systems is important in the increasing of the power generation capacity, and it is preferable that a configuration be adopted in which the frequency band of the half-value width of the first resonance system overlaps the frequency bands of the half-value widths of the other resonance systems (as many of the other resonance systems as possible).

With the power generating element 50 illustrated in FIGS. 6A to 6C, a configuration is adopted that enables the conversion of only vibration in the Z-axis direction to electric energy. However, by configuring the first and second piezoelectric elements 82 and 86 as the first and second piezoelectric elements 98 and 100 illustrated in FIGS. 11A and 11B, vibration in all of X-, Y, and Z-axis directions can be converted to electric energy and the power generation capacity can be increased even more. Alternatively, by configuring the first and second piezoelectric elements 82 and 86 as the first and second piezoelectric elements 104 and 106 illustrated in FIGS. 13A and 13B, vibration in two axial directions, namely the Y-axis direction and the Z-axis direction, can be converted to electric energy and the power generation capacity can be increased even more.

The manufacturing process of the power generating element is not particularly limited and can be freely selected in accordance with the individual structures. For example, the power generating elements 50, 74, 78, 96, and 102 (FIGS. 6A and 6B, FIGS. 9A to 9C, FIGS. 10A to 10C, FIGS. 11A and 11B, and FIGS. 13A and 13B) have configurations in which the plurality of resonance systems are arranged side-by-side and substantially flush with each other along the XY plane and, as such, can be easily manufactured using MEMS technology in which Si substrates, SOI substrates, and the like are used. The specific structure of the piezoelectric element is not limited to the structure of the piezoelectric element 18 illustrated in FIG. 14B, and any structure capable of realizing the same functions may be used.

REFERENCE SIGNS 22, 38, 40, 50, 74, 78, 96, 102 Power generating element
24, 52, 80 First plate-like structure
26, 54, 82, 98, 104 First piezoelectric element
28, 56, 56x, 84 Second plate-like structure
30, 58, 86, 100, 106 Second piezoelectric element
32, 64, 88 Pedestal
34, 46, 66, 90 Connection body
36, 48, 68, 70, 72, 76, 92, 94 Weight body
42, 60 Third plate-like structure
44, 62 Third piezoelectric element
frx1, fry1, frz1 Resonance frequency (first resonance system)
frx2, fry2, frz2 Resonance frequency (second resonance system)
frz3 Resonance frequency (third resonance system)
hx1, hy1, hz1 Half-value width (first resonance system)
hx2, hy2, hz2 Half-value width (second resonance system)
hz3 Half-value width (third resonance system)
Re1 First resonance system
Re2 Second resonance system
Re3 Third resonance system

What is claimed is:
1. A power generating element, comprising:
first and second plate-like structures having flexibility, wherein the first plate-like structure and the second plate-like structure are cantilevered structures;
a pedestal supporting the first plate-like structure; and
a piezoelectric element that generates a charge on the basis of a deflection of the first and second plate-like structures or on the basis of a deflection of the second plate-like structure;
wherein:
the first and second plate-like structures are disposed in an XYZ three-dimensional coordinate system such that plate surfaces of the first and second plate-like structures are surfaces parallel to an XY plane;
a base end portion of the first plate-like structure is directly or indirectly connected to the pedestal, and the first plate-like structure extends in a direction parallel to a Y-axis such that a direction from the base end portion toward a tip end portion of the first plate-like structure becomes a Y-axis positive direction;
a base end portion of the second plate-like structure is connected to the tip end portion of the first plate-like structure via a connection body, and the second plate-like structure extends in a direction parallel to the Y-axis such that a direction from the base end portion toward a tip end portion of the second plate-like structure becomes a Y-axis negative direction; and
a frequency band of a half-value width of a second resonance system formed on the basis of the flexibility of the second plate-like structure at least partially overlaps with a frequency band of a half-value width of a first resonance system formed on the basis of the flexibility of the first plate-like structure;

a resonance frequency of a Z-axis direction of the first resonance system is set by adjusting a spring constant of the Z-axis direction of the first plate-like structure and masses of any members connected to the tip end portion of the first plate-like structure including the connection body, the second plate-like structure, and a weight body connected to the tip end portion of the second plate-like structure; and a resonance frequency of the Z-axis direction of the second resonance system is set by adjusting a spring constant of the Z-axis direction of the second plate-like structure and masses of any members connected to the tip end portion of the second plate-like structure including the weight body connected to the tip end portion of the second plate-like structure.

2. The power generating element according to claim 1, wherein the first and second plate-like structures are disposed overlapping in a direction in which the first and second plate-like structures deflect, with a predetermined spacing therebetween.

3. The power generating element according to claim 2, wherein a length in the Y-axis direction of the second plate-like structure is shorter than a length in the Y-axis direction of the first plate-like structure.

4. The power generating element according to claim 3, wherein a weight body is further provided on the tip end portion of the first plate-like structure.

5. The power generating element according to claim 1, wherein the first and second plate-like structures are disposed on planes parallel to the XY plane, with a predetermined spacing therebetween.

6. The power generating element according to claim 5, wherein a length in the Y-axis direction of the second plate-like structure is shorter than a length in the Y-axis direction of the first plate-like structure.

7. The power generating element according to claim 6, wherein a weight body is further provided on the tip end portion of the first plate-like structure.

8. A power generating element, comprising:

n number of plate-like structures having flexibility, where n is a nonnegative integer of 3 or greater, wherein the n number of plate-like structures are cantilevered structures;

a pedestal supporting a first plate-like structure among the n number of plate-like structures; and a piezoelectric element that generates a charge on the basis of a deflection of the n number of plate-like structures or on the basis of a deflection of an $n^{th}$ plate-like structure;

wherein:

the n number of plate-like structures are disposed in an XYZ three-dimensional coordinate system such that plate surfaces of the n number of plate-like structures are surfaces parallel to an XY plane;

the first plate-like structure extends in a direction parallel to a Y-axis, a base end portion of the first plate-like structure is directly or indirectly connected to the pedestal, and a direction from the base end portion toward a tip end portion of the first plate-like structure is a Y-axis positive direction;

a base end portion of a $ka^{th}$ plate-like structure, where ka is an even number and $2 \leq ka \leq n$, is connected to a tip end portion of a $ka-1^{th}$ plate-like structure via a first connection body, and the $ka^{th}$ plate-like structure of the n number of plate-like structures extends in a direction parallel to the Y-axis such that a direction from the base end portion toward a tip end portion of the $ka^{th}$ plate-like structure becomes a Y-axis negative direction;

a base end portion of a $kb^{th}$ plate-like structure, where kb is an odd number and $3 \leq kb \leq n$, is connected to a tip end portion of a $kb-1^{th}$ plate-like structure via a second connection body, and the $kb^{th}$ plate-like structure of the n number of plate-like structures extends in a direction parallel to the Y-axis such that a direction from the base end portion toward a tip end portion of the $kb^{th}$ plate-like structure becomes a Y-axis positive direction;

a frequency band of a half-value width of a resonance system formed on the basis of the flexibility of the $n^{th}$ plate-like structure at least partially overlaps with a frequency band of a half-value width of a resonance system formed on the basis of the flexibility of another of the plate-like structures;

a resonance frequency of a Z-axis direction of a resonance system formed on the basis of the flexibility of the first plate-like structure is set by adjusting a spring constant of the Z-axis direction of the first plate-like structure and masses of any members connected to the tip end portion of the first plate-like structure including at least the first connection body, the second connection body, the n plate-like structures other than the first plate-like structure, and a weight body connected to a tip end portion of the nth plate-like structure;

a resonance frequency of the Z-axis direction of a resonance system formed on the basis of the flexibility of the $ka^{th}$ plate-like structure is set by adjusting a spring constant of the Z-axis direction of the $ka^{th}$ plate-like structure and masses of any members connected to the tip-end portion of the $ka^{th}$ plate-like structure including at least the second connection body, the $kb^{th}$ plate-like structure, and the weight body connected to the tip end portion of the nth plate-like structure; and a resonance frequency of the Z-axis direction of a resonance system formed on the basis of the flexibility of the $kb^{th}$ plate-like structure is set by adjusting a spring constant of the Z-axis direction of the $kb^{th}$ plate-like structure and masses of any members connected to the tip end portion of the $kb^{th}$ plate-like structure including at least the weight body connected to the tip end portion of the nth plate-like structure.

9. The power generating element according to claim 8, wherein the n number of plate-like structures are disposed overlapping in a direction in which the plate-like structures deflect, with a predetermined spacing therebetween.

10. The power generating element according to claim 9, wherein a length in the Y-axis direction of the $n^{th}$ plate-like structure is shorter than a length in the Y-axis direction of an $n-1^{th}$ plate-like structure.

11. The power generating element according to claim 10, wherein a weight body is further provided on the tip end portion of at least another of the n number of plate-like structures.

12. The power generating element according to claim 8, wherein the n number of plate-like structures are disposed on planes parallel to the XY plane, with a predetermined spacing therebetween.

13. The power generating element according to claim 12, wherein the n number of plate-like structures are disposed on a same plane as the XY plane, with a predetermined spacing therebetween.

14. The power generating element according to claim 13, wherein a length in the Y-axis direction of the $n^{th}$ plate-like structure is shorter than a length in the Y-axis direction of an $n-1^{th}$ plate-like structure.

15. The power generating element according to claim 14, wherein a weight body is further provided on the tip end portion of at least another of the n number of plate-like structures.

16. A power generating element, comprising:
n number of plate-like structures having flexibility, where n is a nonnegative integer of 3 or greater, wherein the n number of plate-like structures are cantilevered structures;
a pedestal supporting a first plate-like structure among the n number of plate-like structures; and
a piezoelectric element that generates a charge on the basis of a deflection of the n number of plate-like structures or on the basis of a deflection of the second to $n^{th}$ plate-like structures;
wherein:
the n number of plate-like structures are disposed in an XYZ three-dimensional coordinate system such that plate surfaces of the n number of plate-like structures are surfaces parallel to an XY plane;
the first plate-like structure extends in a direction parallel to a Y-axis, a base end portion of the first plate-like structure is directly or indirectly connected to the pedestal, and a direction from the base end portion toward a tip end portion of the first plate-like structure is a Y-axis positive direction;
base end portions of the plate-like structures other than the first plate-like structure are connected to the tip end portion of the first plate-like structure via a connection body, and the plate-like structures other than the first plate-like structure extend in a direction parallel to the Y-axis such that a direction from the base end portions toward tip end portions of the plate-like structures other than the first plate-like structure becomes a Y-axis negative direction;
a frequency band of a half-value width of a resonance system formed on the basis of the flexibility of the first plate-like structure at least partially overlaps with a frequency band of a half-value width of a resonance system formed on the basis of the flexibility of another of the plate-like structures;
a resonance frequency of a Z-axis direction of the resonance system formed on the basis of the flexibility of the first plate-like structure is set by adjusting a spring constant of the Z-axis direction of the first plate-like structure and masses of any members connected to the tip end portion of the first plate-like structure including at least the connection body, the plate-like structures among the n number of plate-like structures other than the first plate-like structure, and weight bodies respectively connected to the tip end portions of the plate-like structures other than the first plate-like structure; and
respective resonance frequencies of the Z-axis direction of resonance systems formed on the basis of the flexibility of the plate-like structures other than the first plate-like structure are set by adjusting a spring constant of the Z-axis direction of the respective other plate-like structures and masses of any members connected to the respective tip end portions of the other plate-like structures other than the first plate-like structure including the weight bodies respectively connected to the tip end portions of the plate-like structures other than the first plate-like structure.

17. The power generating element according to claim 16, wherein the n number of plate-like structures are disposed overlapping in a direction in which the plate-like structures deflect, with a predetermined spacing therebetween.

18. The power generating element according to claim 17, wherein a length in the Y-axis direction of the $n^{th}$ plate-like structure is shorter than a length in the Y-axis direction of an $n-1^{th}$ plate-like structure.

19. The power generating element according to claim 18, wherein a weight body is provided on the tip end portion of the plate-like structure of at least a portion of the n number of plate-like structures.

20. The power generating element according to claim 16, wherein the n number of plate-like structures are disposed on planes parallel to the XY plane, with a predetermined spacing therebetween.

21. The power generating element according to claim 20, wherein the n number of plate-like structures are disposed on a same plane as the XY plane, with a predetermined spacing therebetween.

22. The power generating element according to claim 21, wherein a length in the Y-axis direction of the $n^{th}$ plate-like structure is shorter than a length in the Y-axis direction of an $n-1^{th}$ plate-like structure.

23. The power generating element according to claim 22, wherein a weight body is provided on the tip end portion of the plate-like structure of at least a portion of the n number of plate-like structures.

* * * * *